(12) United States Patent
Saito et al.

(10) Patent No.: US 7,359,127 B2
(45) Date of Patent: Apr. 15, 2008

(54) IMAGING LENS

(75) Inventors: Tomohiro Saito, Kawaguchi (JP);
Masato Nakamura, Kawaguchi (JP);
Tomonori Ogura, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 11/714,581

(22) Filed: Mar. 6, 2007

(65) Prior Publication Data

US 2007/0217033 A1 Sep. 20, 2007

(30) Foreign Application Priority Data

Mar. 9, 2006  (JP) .............................. 2006-064039

(51) Int. Cl.
*G02B 9/14* (2006.01)
*G02B 13/18* (2006.01)
*G02B 3/02* (2006.01)

(52) U.S. Cl. ...................................... 359/785; 359/716

(58) Field of Classification Search ................ 359/716, 359/785, 789, 690, 784, 689

See application file for complete search history.

(56) References Cited

U.S. PATENT DOCUMENTS 6,970,306 B2 * 11/2005 Matsuo ........................ 359/716

* cited by examiner

*Primary Examiner*—Alicia M Harrington
(74) *Attorney, Agent, or Firm*—William L. Androlia; H. Henry Koda

(57) ABSTRACT

It is to provide an imaging lens that can maintain telecentricity, sufficiently correct various aberrations, and acquire an excellent resolution, while being small and light. The imaging lens comprises, in order from an object side towards an image surface side, a first lens which is a biconvex lens, a diaphragm, a second lens which is a meniscus lens having a negative power whose convex surface faces the image surface side, and a third lens which is a meniscus lens having a positive power whose convex surface faces the object side, wherein conditions expressed by each of following expressions are to be satisfied: $0.7 \leq f_1/fl \leq 1$, $-6 \leq f_2/fl \leq -2.8$, and $3 \leq f_3/fl \leq 10$ (where, fl: focal distance of the entire lens system, $f_1$: focal distance of the first lens, $f_2$: focal distance of the second lens, and $f_3$: focal distance of the third lens).

6 Claims, 25 Drawing Sheets

IMAGING LENS

BACKGROUND OF THE INVENTION

1. Field of the Invention

The present invention relates to an imaging lens. In particular, the present invention relates to an imaging lens having a three-lens structure that is suitable for size and weight reduction. The imaging lens is used in an image-taking device that uses a solid image pickup device, such as a charge-coupled device (CCD), a complementary metal oxide semiconductor (CMOS), etc. The solid image pickup device is mounted on a portable computer, a television phone, a portable phone, a digital camera, and the like.

2. Description of the Related Art

In recent years, there has been an increasing demand for cameras that utilize a solid image pickup device, such as a CCD, CMOS, or the like, which is mounted on a portable computer, a television phone, a portable phone, a digital camera, and the like. It is demanded that a camera such as this is small and light because the camera is required to be mounted on a limited installation space.

Therefore, it is also necessary for the imaging lens used in such cameras to be similarly small and light. Conventionally, a single-lens structure lens system using a single lens and a two-lens structure lens system using two lenses are used as such imaging lenses.

However, although such imaging lenses are extremely effective in reducing the size and weight of the lens system, the imaging lens cannot sufficiently handle high image quality and high resolution required of the imaging lenses in recent years.

Therefore, conventionally, a three-lens structure lens system using three lenses is used to handle high image quality and high resolution.

As examples of such a three-lens structure lens system attempting to enhance image quality and resolution, for example, the lens systems described in the following Patent Literatures 1 to 4 are known.

[Patent Literature 1] Japanese Patent Unexamined Publication 2005-84479

[Patent Literature 2] Japanese Patent Unexamined Publication 2005-345713

[Patent Literature 3] Japanese Patent Unexamined Publication 2003-149545

[Patent Literature 4] Japanese Patent Unexamined Publication Heisei 10-301021

However, in the lens system described in Patent Literature 1, a diaphragm is disposed on an object side of a first lens. Therefore, distortion correction becomes difficult.

In the lens system described in Patent Literature 2, a first lens is a meniscus lens of which the convex surface faces the object side. Therefore, distortion occurring in the first lens is significant. As a result, the distortion occurring in the overall optical system is large.

Furthermore, in the lens system described in Patent Literature 3, the first lens has a negative power. Therefore, size and weight reduction is difficult.

Still further, in the lens system described in Patent Literature 4, a diaphragm is disposed between a second lens and a third lens. In addition, the third lens has a negative power and a strong concave surface that faces the object side. Therefore, telecentricity is poor. In addition, in the lens system described in Patent Literature 4, the distance between a second lens and a third lens is too wide. Therefore, the effective diameter of the third lens is too large. As a result, the size and weight reduction of the lens system becomes difficult.

Therefore, the conventional lens system was insufficient for maintaining telecentricity, sufficiently correcting various aberrations, and acquiring excellent resolution, while reducing the size and weight.

SUMMARY OF THE INVENTION

The present invention has been achieved in light of the above-described problems. An object of the invention is to provide an imaging lens that can maintain telecentricity, sufficiently correct various aberrations, and acquire excellent resolution, while being small and light.

In order to achieve the aforementioned object, an imaging lens according to a first aspect of the present invention comprises, in order from an object side to an image surface side: a first lens which is a biconvex lens, a diaphragm, a second lens which is a meniscus lens having a negative power whose convex surface faces the image surface side, and a third lens which is a meniscus lens having a positive power whose convex surface faces the object side, wherein conditions expressed by each of following expressions (1) to (3) are to be satisfied:

$$0.7 \leq f_1/fl \leq 1 \tag{1}$$

$$-6 \leq f_2/fl \leq -2.8 \tag{2}$$

$$3 \leq f_3/fl \leq 10 \tag{3}$$

where, fl: focal distance of the entire lens system
$f_1$: focal distance of the first lens
$f_2$: focal distance of the second lens
$f_3$: focal distance of the third lens In the first aspect of the invention, the first lens is a biconvex lens, the second lens is a meniscus lens having a negative power whose convex surface faces the image surface side, and the third lens is a meniscus lens having a positive power whose convex surface faces the object side. The diaphragm is disposed between the first lens and the second lens. Furthermore, each condition expressed by the expressions (1) to (3) is satisfied. Therefore, the optical system can be reduced in size, the telecentricity can be maintained, and various aberrations, such as distortion, spherical aberration, coma aberration, field curvature, and axial chromatic aberration, can be successfully corrected.

An imaging lens according to a second aspect is the imaging lens according to the first aspect, wherein, further, a condition expressed by a following expression (4) is to be satisfied:

$$-0.3 \leq r_1/r_2 < 0 \tag{4}$$

where,
$r_1$: center radius curvature of the object side face of the first lens
$r_2$: center radius curvature of the imaging surface side face of the first lens In the second aspect of the present invention, further, the expression (4) is satisfied. Therefore, the spherical aberration can be more successfully corrected.

An imaging lens according to a third aspect is the imaging lens according to the first aspect, wherein, further, a condition expressed by a following expression (5) is to be satisfied:

$$0.7 \leq r_5/fl \leq 1.2 \quad (5)$$

where, $r_5$: center radius curvature of the object side face of the third lens

In the third aspect of the invention, further, the expression (5) is satisfied. Therefore, the coma aberration and the distortion can be more successfully corrected.

An imaging lens according to a fourth aspect is the imaging lens according to the first aspect, wherein, further, conditions expressed by each of following expressions (6) to (8) are to be satisfied:

$$v_1 \geq 50 \quad (6)$$

$$v_2 \leq 40 \quad (7)$$

$$v_3 \geq 50 \quad (8)$$

where, $v_1$: Abbe number of the first lens
$v_2$: Abbe number of the second lens
$v_3$: Abbe number of the third lens In the fourth aspect of the present invention, each condition expressed by the expressions (6) to (8) is satisfied. Therefore, the chromatic aberration can be more successfully corrected.

An imaging lens according to a fifth aspect is the imaging lens according to any one of aspects 1 to 4, wherein an image surface side face of the third lens has an aspherical shape in which the negative power is weakened towards the periphery.

In the fifth aspect of the invention, further, the image surface side face of the third lens has an aspherical shape in which the negative power is weakened towards the periphery. Therefore, the aberration of each image height can be effectively corrected.

An imaging lens according to a sixth aspect is the imaging lens according to any one of aspects 1 to 4, wherein an image surface side face of the third lens has an aspherical shape which is convex towards the periphery.

In the sixth aspect of the invention, further, the image surface side face of the third lens has an aspherical shape in which the lens surface facing the image surface side becomes convex towards the periphery. Therefore, the aberration of each image height can be effectively corrected.

With the imaging lens according to the first aspect of the present invention, the optical system can be reduced in size, the telecentricity can be maintained, and various aberrations, such as distortion, spherical aberration, coma aberration, field curvature, and axial chromatic aberration, can be successfully corrected. As a result, the imaging lens according to the first aspect can achieve an imaging lens that can maintain telecentricity, sufficiently correct the various aberrations, and acquire an excellent resolution, while being small and light.

Further, with the imaging lens according to the second aspect, the spherical aberration can be more successfully corrected. As a result, in addition to the effects of the imaging lens according to the first aspect, an imaging lens according to the second aspect can achieve an imaging lens that can acquire a more excellent resolution.

Further, with the imaging lens according to the third aspect, the coma aberration and the distortion can be more successfully corrected. As a result, in addition to the effects of the imaging lens according to the first or second aspect, an imaging lens according to the third aspect can achieve an imaging lens that can further enhance the resolution.

Further, with the imaging lens according to the fourth aspect, the chromatic aberration can be more successfully corrected. As a result, in addition to the effects of the imaging lens according to any one of aspects 1 to 3, an imaging lens according to the fourth aspect can achieve an imaging lens that can further enhance the resolution.

Further, with the imaging lens according to the fifth aspect, the aberration of each image height can be effectively corrected. As a result, in addition to the effects of the imaging lens according to any one of aspects 1 to 4, an imaging lens according to the fifth aspect can achieve an imaging lens that has a more superior resolution.

Further, with the imaging lens according to the sixth aspect, the aberration of each image height can be effectively corrected. As a result, in addition to the effects of the imaging lens according to any one of aspects 1 to 4, an imaging lens according to the sixth aspect can achieve an imaging lens that has a more superior resolution.

DETAILED DESCRIPTION OF THE PREFERRED EMBODIMENT

An embodiment of the imaging lens according to the present invention will be described hereinafter with reference to FIG. 1.

Figure 1:
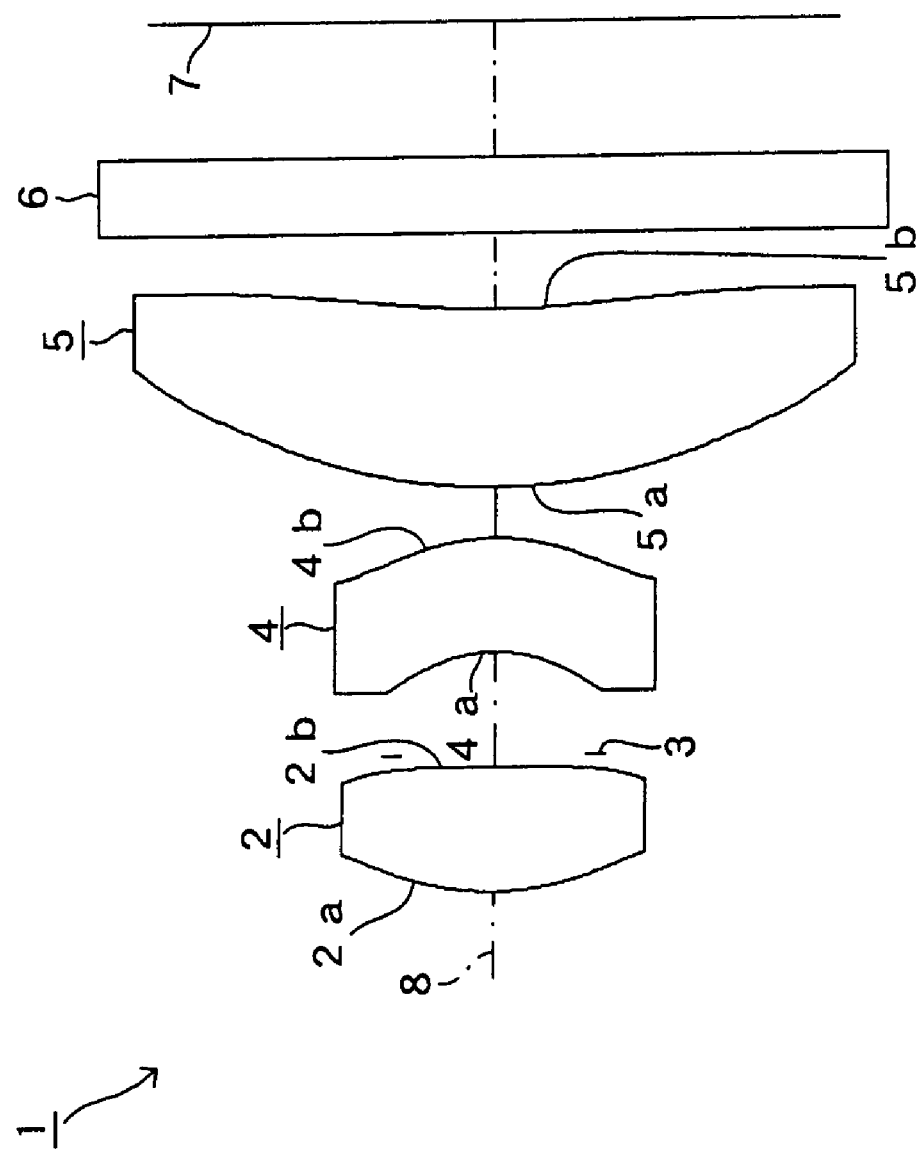
FIG. 1 is a schematic diagram for showing an embodiment of the imaging lens according to the present invention.

As shown in FIG. 1, an imaging lens 1 according to the embodiment comprises, in order from the object side toward the image surface side, a first lens 2 which is a biconvex lens, a diaphragm 3, a second lens 4 which is a meniscus lens having a negative power whose convex surface faces the image surface side, and a third lens 5 which is a meniscus lens having a positive power whose convex surface faces the object side.

Hereafter, respective lens surfaces 2a, 4a, and 5a on the object side of the lenses 2, 4, and 5 are respectively referred to as a first face 2a, a first face 4a, and a first face 5a. Respective lens surfaces 2b, 4b, and 5b on the image surface side of the lenses 2, 4, and 5 are respectively referred to as a second face 2b, a second face 4b, and a second face 5b.

On the second face 5b of the third lens 5, there are respectively disposed various filters 6, such as a cover glass, an IR cut filter, and a low pass filter, and an image-taking surface 7 which is a light-receiving surface of an image sensor element, such as a CCD or a CMOS. The filter 6 may be omitted as required.

In this way, according to the embodiment, the first lens 2 can be given the main power of the optical system by the first lens 2 being a biconvex lens. The optical system can be more effectively reduced in size, compared to when power is dispersed among respective lenses 2, 4, and 5.

In addition, according to the embodiment, the diaphragm 3 can be placed away from the image surface by the diaphragm 3 being disposed between the first lens 2 and the second lens 4. As a result, the telecentricity can be maintained.

Further, according to the embodiment, the second lens 4 is a meniscus lens having a negative power whose convex surface faces the image surface side. As a result, off-axis aberrations particularly coma aberration) can be successfully corrected.

The aberrations can be more successfully corrected if the first face 4a of the second lens 4 and the second face 4b of the second lens 4 are both aspherical.

Still further, according to the embodiment, the third lens 5 is a meniscus lens having a positive power whose convex surface faces the object side. As a result, the telecentricity can be improved.

The aberrations of the image height can be effectively corrected if the second face 5b of the third lens 5 is aspherical. In other words, the third lens 5 is a lens whose convex surface faces the object side. Therefore, when each light ray incident on the optical system from each object point on an object plane is separated by image height after passing through the diaphragm 3, each light ray incident on the first face 5a of the third lens 5 after passing through the diaphragm 3 can be more effectively separated by the first face 5a. In addition, the aberrations (particularly the astigmatism) of each light ray separated by each image height can be effectively corrected by light ray, by the second face 5b of the third lens 5 having an aspherical shape.

Still further, according to the embodiment, conditions expressed by each of following expressions (1) to (3) are to be satisfied:

$$0.7 \leq f_1/fl \leq 1 \quad (1)$$

$$-6 \leq f_2/fl \leq -2.8 \quad (2)$$

$$3 \leq f_3/fl \leq 10 \quad (3)$$

where, fl in the expressions (1) to (3) is the focal distance of the entire lens system. fl in the expressions (1) to (3) is the focal distance of the entire lens system. $f_1$ in the expression (1) is the focal distance of the first lens 2. $f_2$ in the expression (2) is the focal distance of the second lens 4. $f_3$ in the expression (3) is the focal distance of the third lens 5.

When the value of $f_1/fl$ exceeds than the value (1) shown in the expression (1), the power of the first lens 2 becomes too weak. As a result, size reduction becomes difficult.

At the same time, when the value of $f_1/fl$ is smaller than the value (0.7) shown in the expression (1), the power of the first lens 2 becomes too strong. As a result, the aberrations become difficult to correct.

Therefore, according to the embodiment, by the value of $f_1/fl$ being set to satisfy the expression (1), both size and weight reduction and increased performance (enhanced resolution) can be achieved.

It is more preferable for the relation between $f_1$ and fl to satisfy an expression $0.8 \leq f_1/fl \leq 0.9$.

Further, when the value of $f_2/fl$ exceeds than the value (−2.8) shown in the expression (2), the negative power becomes too strong. As a result, the coma aberration is exacerbated and Petzval sum involving the field curvature becomes excessively corrected.

At the same time, when the value of $f_2/fl$ is smaller than the value (−6) shown in the expression (2), the negative power becomes too weak. As a result, the telecentricity is degraded and the chromatic aberration is insufficiently corrected.

Therefore, according to the embodiment, by the value of $f_2/fl$ being set to satisfy the expression (2), the various aberrations, such as coma aberration and field curvature, can be successfully corrected and the telecentricity can be more effectively maintained.

It is more preferable for the relation between $f_2$ and $fl$ to satisfy an expression $-5.5 \leq f_2/fl \leq -4$.

Further, when the value of $f_3/fl$ exceeds than the value (10) shown in the expression (3), the positive power becomes too weak. As a result, the telecentricity is degraded.

At the same time, when the value of $f_3/fl$ is smaller than the value (3) shown in the expression (3), the back focus distance becomes too short. As a result, insertion of the filter 6, such as the cover glass, becomes difficult and problems occur during actual use.

Therefore, according to the embodiment, by the value of $f_3/fl$ being set to satisfy the expression (3), the back focus distance can be appropriately maintained and the telecentricity can be improved.

It is more preferable for the relation between $f_3$ and $fl$ to satisfy an expression $3.5 \leq f_3/fl \leq 7$.

In addition to the above-described structure, according to the embodiment, a condition expressed by a following expression (4) is to be satisfied:

$$-0.3 \leq r_1/r_2 \leq 0 \qquad (4)$$

where, $r_1$ in the expression (4) is the center radius curvature of the first face 2a of the first lens 2. $r_2$ in the expression (4) is the center radius curvature of the second face 2b of the first lens 2.

When the value of $r_1/r_2$ is equal to or more than the value (0) shown in the expression (4), the spherical aberration of the second face 2b of the first lens 2 becomes large. As a result, size reduction becomes more difficult.

At the same time, when the value of $r_1/r_2$ is smaller than the value (−0.3) shown in the expression (4), the spherical aberration of the first face 2a of the first lens 2 becomes large.

Therefore, according to the embodiment, by the value of $r_1/r_2$ being set to satisfy the expression (4), the spherical aberration can be more successfully corrected.

It is more preferable for the relation between $r_1$ and $r_2$ to satisfy an expression $-0.1 \leq r_1/r_2 \leq 0$.

In addition to the above-described structure, according to the embodiment, a condition expressed by a following expression (5) is to be satisfied:

$$0.7 \leq r_5/fl \leq 1.2 \qquad (5)$$

where, $r_5$ in the expression (5) is the center radius curvature of the first face 5a of the third lens 5.

When the value of $r_5/fl$ exceeds the value (1.2) shown in the expression (5), the coma aberration becomes difficult to correct.

At the same time, when the value of $r_5/fl$ is smaller than the value (0.7) shown in the expression (5), negative distortion becomes large.

Therefore, according to the embodiment, by the value of $r_5/fl$ being set to satisfy the expression (5), the coma aberration and the distortion can be more successfully corrected.

It is more preferable for the relation between $r_5$ and $fl$ to satisfy an expression $0.9 \leq r_5/fl \leq 1.1$.

In addition to the above-described structure, according to the embodiment, conditions expressed by each of following expressions (6) to (8) are to be satisfied:

$$v_1 \geq 50 \qquad (6)$$

$$v_2 \leq 40 \qquad (7)$$

$$v_3 \geq 50 \qquad (8)$$

where, $v_1$ in the expression (6) is the Abbe number of the first lens 2. $v_2$ in the expression (7) is the Abbe number of the second lens 4. $v_3$ in the expression (8) is the Abbe number of the third lens 5.

When the value of $v_1$ is smaller than the value (50) shown in the expression (6), the value of $v_2$ exceeds the value (40) shown in the expression (7), or the value of $v_3$ is smaller than the value (50) shown in the expression (8), the chromatic aberration becomes difficult to correct.

Therefore, according to the embodiment, by the value of $v_1$ being set to satisfy the expression (6), the value of $v_2$ being set to satisfy the expression (7), and the value of $v_3$ being set to satisfy the expression (8), the chromatic aberration can be more successfully corrected.

It is more preferable for the second face 5b of the third lens 5 to have an aspherical shape in which the negative power is weakened from the center (optical axis 8 side) towards the periphery or have an aspherical shape in which the lens surface facing the image surface side becomes convex from the center towards the periphery.

As a result, the above-described correction of the aberrations by image height can be more effectively performed.

EXAMPLES

Next, EXAMPLES of the present invention will be described with reference to FIG. 2 to FIG. 25.

In the EXAMPLES, F no denotes F number, ω denotes the angle of view (angle of view of opposing angles), and r denotes the center radius curvature. Further, d denotes a distance to the next optical surface, nd denotes the index of refraction of each optical system when the d line (yellow) is irradiated, and vd denotes the Abbe number of each optical system also when the d line is irradiated.

k, A, B, C, and D denote each coefficient in a following expression (9). Specifically, the shape of the aspherical surface of the lens is expressed by the following expression provided that the direction of the optical axis 8 is taken as the Z axis, the direction orthogonal to the optical axis 8 (height direction) as the X axis, the traveling direction of light is positive, k is the constant of cone, A, B, C, and D are the aspherical coefficients, and r is the center radius curvature.

$$Z(X) = r^{-1}X'^2 / \left[1 + \{1-(k+1)r^{-2}X^2\}^{1/2}\right] + AX^4 + BX^6 + CX^8 + DX^{10} \qquad (9)$$

In the following EXAMPLES, reference code E used for a numerical value denoting the constant of cone and the aspherical coefficient indicates that the numerical value following E is an exponent having 10 as the base and that the numerical value before E indicates is multiplied by the numerical value denoted by the exponent having 10 as the base.

For example, 1.2E−1 denotes $1.2 \times 10^{-1}$.

First Example

Figure 2:
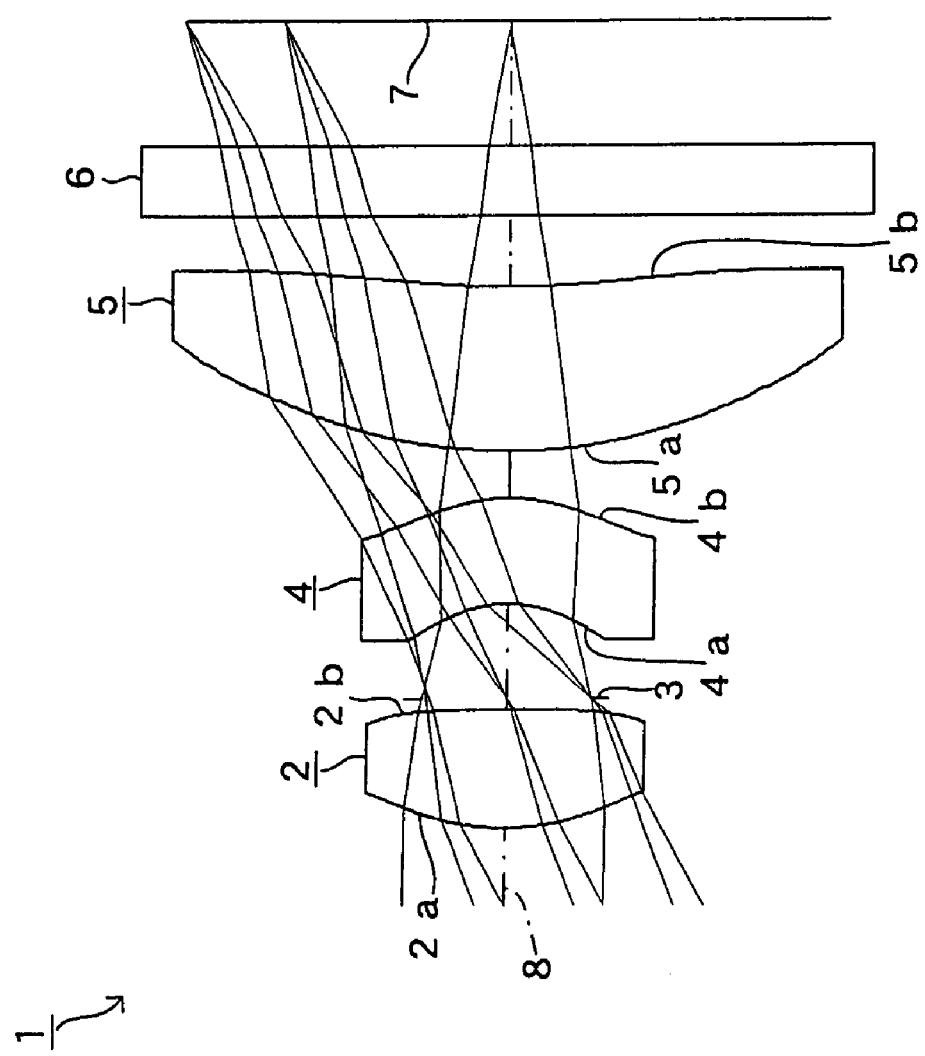
FIG. 2 is a schematic diagram for showing FIRST EXAMPLE of the imaging lens according to the present invention.

FIG. 2 shows a FIRST EXAMPLE of the present invention. The imaging lens 1 according to the FIRST EXAMPLE shown in FIG. 2 is the same imaging lens 1 as that shown in FIG. 1.

The imaging lens 1 of the FIRST EXAMPLE was set under the following conditions:

Lens Data
fl = 2.54 mm, $f_1$ = 2.12 mm, $f_2$ = −12.19 mm,
$f_3$ = 14.68 mm, F no = 2.8, ω = 58.7

| Face Number | r | d | nd | vd |
|---|---|---|---|---|
| (Object Point) | | | | |
| 1 (First Face of First Lens) | 1.176 | 0.50 | 1.5310 | 56 |
| 2 (Second Face of First Lens) | −22.222 | 0.05 | | |
| 3 (Diaphragm) | 0.000 | 0.40 | | |
| 4 (First Face of Second Lens) | −0.606 | 0.45 | 1.5850 | 30 |
| 5 (Second Face of Second Lens) | −0.844 | 0.20 | | |
| 6 (First Face of Third Lens) | 2.532 | 0.70 | 1.5310 | 56 |
| 7 (Second Face of Third Lens) | 3.390 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.8 | 1.1E−1 | −2.7E−1 | 5.8E−1 | −2.1 |
| 2 | 0 | −1.7E−1 | −5.0E−1 | −2.7E−1 | 1.1 |
| 4 | 2.8E−1 | 6.4E−1 | 4.2 | −1.3E+1 | 4.5E+1 |
| 5 | 5.5E−2 | 4.9E−1 | 7.6E−1 | −3.8E−1 | 5.6E−1 |
| 6 | 9.0E−1 | 7.7E−3 | −2.6E−2 | 8.0E−3 | −6.2E−4 |
| 7 | −6.4 | −1.5E−1 | 1.4E−1 | −7.2E−2 | 1.4E−2 |

Under such conditions, $f_1/fl=0.83$ was achieved, thereby satisfying the expression (1). $f_2/fl=-4.80$ was achieved, thereby satisfying the expression (2). $f_3/fl=5.78$ was achieved, thereby satisfying the expression (3). $r_1/r_2=-0.05$ was achieved, thereby satisfying the expression (4). $r_5/fl=1.00$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 3:
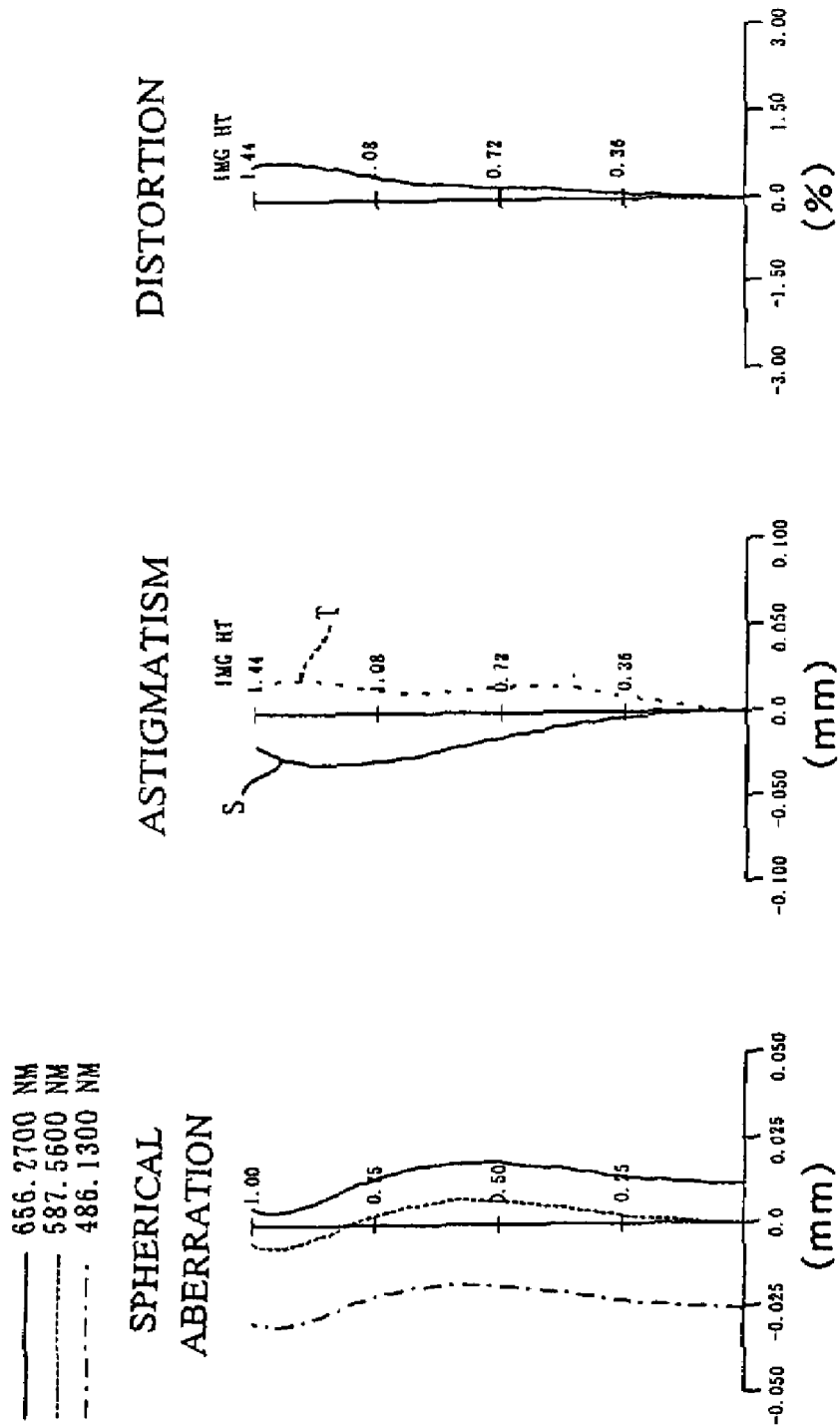
FIG. 3 shows graphs for describing the spherical aberration, astigmatism, and distortion of the imaging lens shown in FIG. 2.

FIG. 3 shows the spherical aberration, the astigmatism, and the distortion in the imaging lens 1 of the FIRST EXAMPLE.

According to the result, each of the spherical aberration, the astigmatism, and the distortion was almost satisfied. It can be seen from the result that a sufficiently excellent optical property can be obtained.

Second Example

Figure 4:
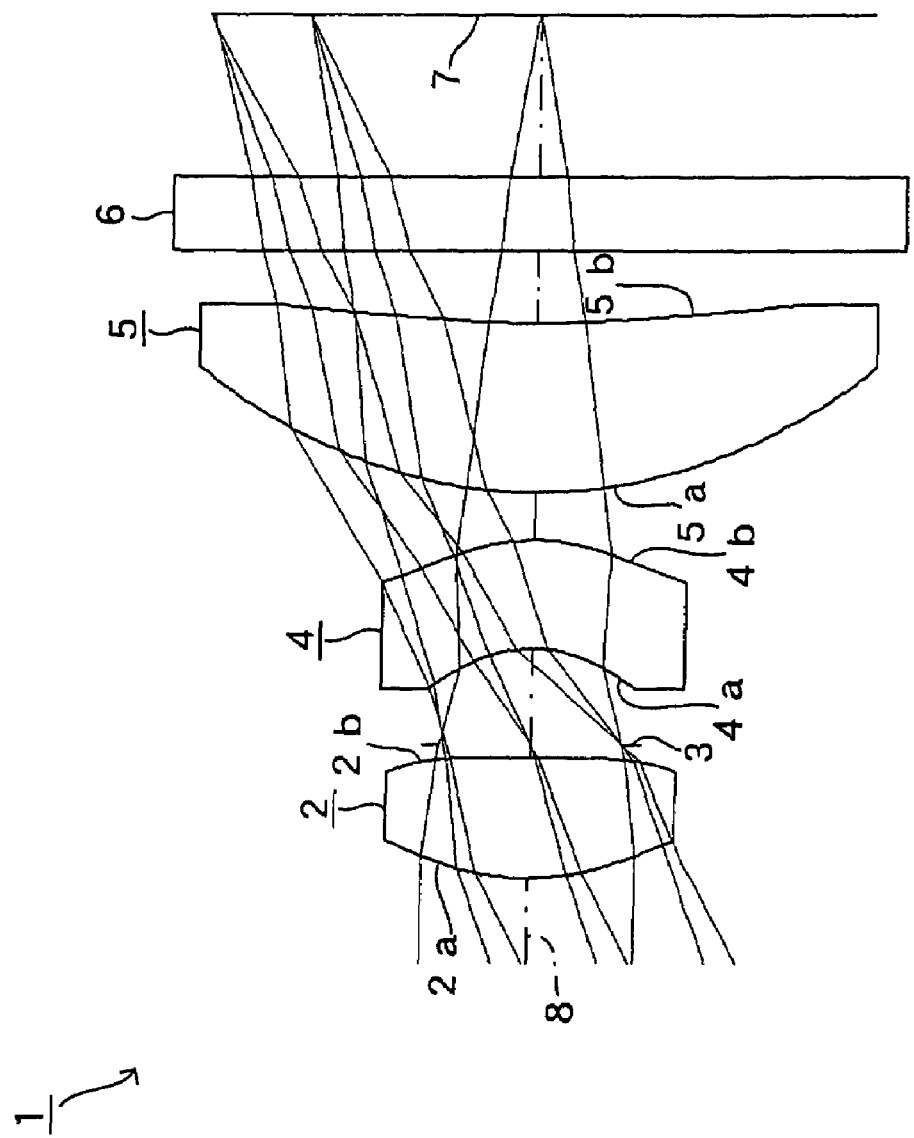
FIG. 4 is a schematic diagram for showing SECOND EXAMPLE of the imaging lens according to the present invention.

FIG. 4 shows a SECOND EXAMPLE of the present invention. The imaging lens 1 of the SECOND EXAMPLE was set under the following conditions:

Lens Data
fl = 2.62 mm, $f_1$ = 2.19 mm, $f_2$ = −7.58 mm,
$f_3$ = 8.12 mm, F no = 2.8, ω = 57.5

| Face Number | r | d | nd | vd |
|---|---|---|---|---|
| (Object Point) | | | | |
| 1 (First Face of First Lens) | 1.198 | 0.50 | 1.5310 | 56 |
| 2 (Second Face of First Lens) | −34.001 | 0.05 | | |
| 3 (Diaphragm) | 0.000 | 0.40 | | |
| 4 (First Face of Second Lens) | −0.587 | 0.45 | 1.5850 | 30 |
| 5 (Second Face of Second Lens) | −0.868 | 0.20 | | |
| 6 (First Face of Third Lens) | 2.250 | 0.70 | 1.5310 | 56 |
| 7 (Second Face of Third Lens) | 4.200 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.6 | 1.1E−1 | −3.0E−1 | 6.4E−1 | −2.1 |
| 2 | 0 | −1.5E−1 | −5.1E−1 | −4.3E−1 | 1.1 |
| 4 | 2.0E−1 | 6.7E−1 | 4.2 | −1.3E+1 | 4.5E+1 |
| 5 | 5.5E−2 | 4.7E−1 | 6.8E−1 | −5.2E−1 | 5.6E−1 |
| 6 | 9.0E−1 | 3.2E−3 | −2.5E−2 | 7.4E−3 | −1.4E−3 |
| 7 | −6.4 | −1.3E−1 | 1.4E−1 | −7.2E−2 | 1.4E−2 |

Under such conditions, $f_1/fl=0.84$ was achieved, thereby satisfying the expression (1). $f_2/fl=-2.89$ was achieved, thereby satisfying the expression (2). $f_3/fl=3.10$ was achieved, thereby satisfying the expression (3). $r_1/r_2=-0.04$ was achieved, thereby satisfying the expression (4). $r_5/fl=0.86$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 5:
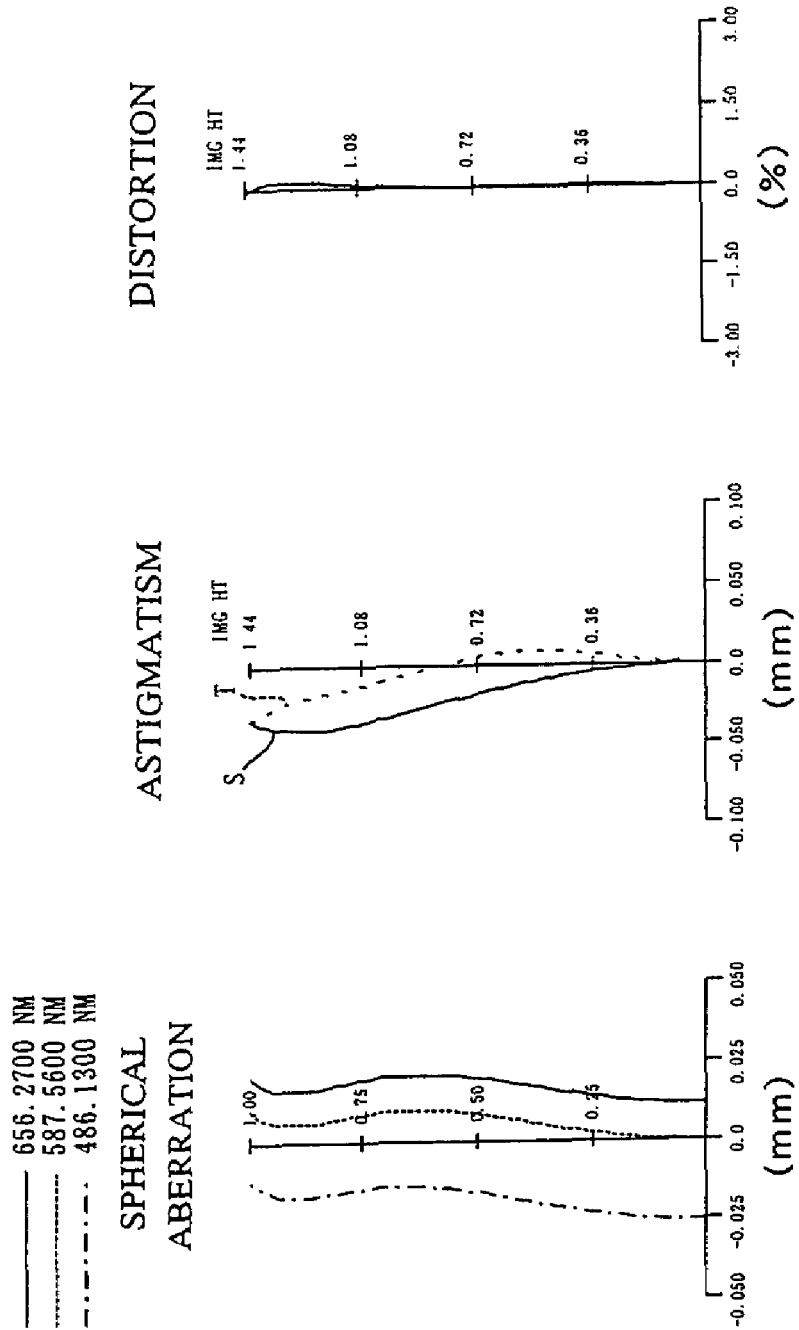
FIG. 5 shows graphs for describing the spherical aberration, astigmatism, and distortion of the imaging lens shown in FIG. 4.

FIG. 5 shows the spherical aberration, the astigmatism, and the distortion in the imaging lens 1 of the SECOND EXAMPLE.

According to the result, each of the spherical aberration, the astigmatism, and the distortion was almost satisfied. It can be seen from the result that a sufficiently excellent optical property can be obtained.

Third Example

Figure 6:
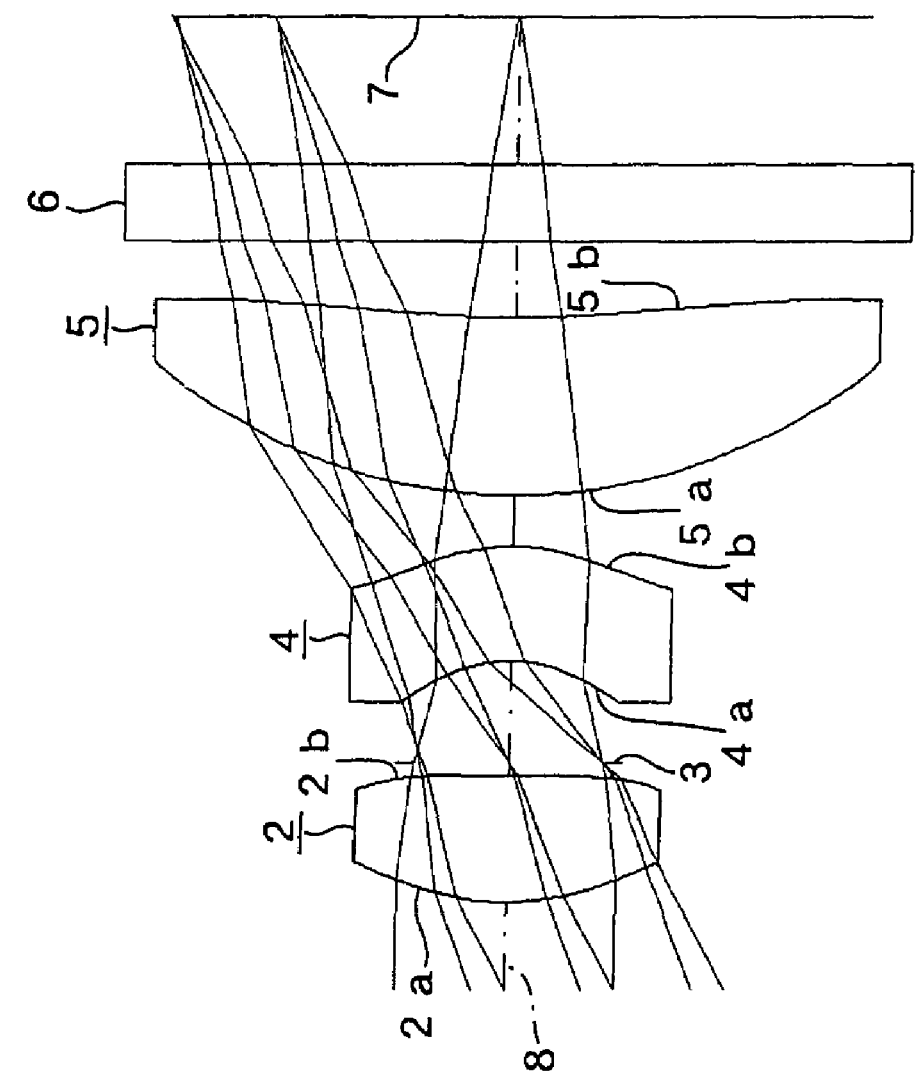
FIG. 6 is a schematic diagram for showing THIRD EXAMPLE of the imaging lens according to the present invention.

FIG. 6 shows a THIRD EXAMPLE of the present invention. The imaging lens 1 of the THIRD EXAMPLE was set under the following conditions:

Lens Data
fl = 2.57 mm, $f_1$ = 2.13 mm, $f_2$ = −8.98 mm,
$f_3$ = 10.21 mm, F no = 2.8, ω = 58.7

| Face Number | r | d | nd | vd |
|---|---|---|---|---|
| (Object Point) | | | | |
| 1 (First Face of First Lens) | 1.176 | 0.50 | 1.5310 | 56 |
| 2 (Second Face of First Lens) | −26.609 | 0.05 | | |
| 3 (Diaphragm) | 0.000 | 0.40 | | |
| 4 (First Face of Second Lens) | −0.595 | 0.45 | 1.5850 | 30 |
| 5 (Second Face of Second Lens) | −0.858 | 0.20 | | |
| 6 (First Face of Third Lens) | 2.360 | 0.70 | 1.5310 | 56 |
| 7 (Second Face of Third Lens) | 3.750 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.6 | 1.1E−1 | −2.9E−1 | 6.1E−1 | −2.1 |
| 2 | 0 | −1.6E−1 | −5.1E−1 | −3.5E−1 | 1.1 |

-continued

Lens Data
fl = 2.57 mm, $f_1$ = 2.13 mm, $f_2$ = −8.98 mm,
$f_3$ = 10.21 mm, F no = 2.8, ω = 58.7

| | | | | |
|---|---|---|---|---|
| 4 | 2.3E−1 | 6.5E−1 | 4.2 | −1.3E+1 | 4.5E+1 |
| 5 | 5.5E−2 | 4.9E−1 | 7.2E−1 | −4.6E−1 | 5.6E−1 |
| 6 | 9.0E−1 | 6.3E−3 | −2.6E−2 | 7.6E−3 | −9.7E−4 |
| 7 | −6.4 | −1.4E−1 | 1.4E−1 | −7.2E−2 | 1.4E−2 |

Under such conditions, $f_1/fl=0.83$ was achieved, thereby satisfying the expression (1). $f_2/fl=-3.49$ was achieved, thereby satisfying the expression (2). $f_3/fl=3.97$ was achieved, thereby satisfying the expression (3). $r_1/r_2=-0.04$ was achieved, thereby satisfying the expression (4). $r_5/fl=0.92$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 7:
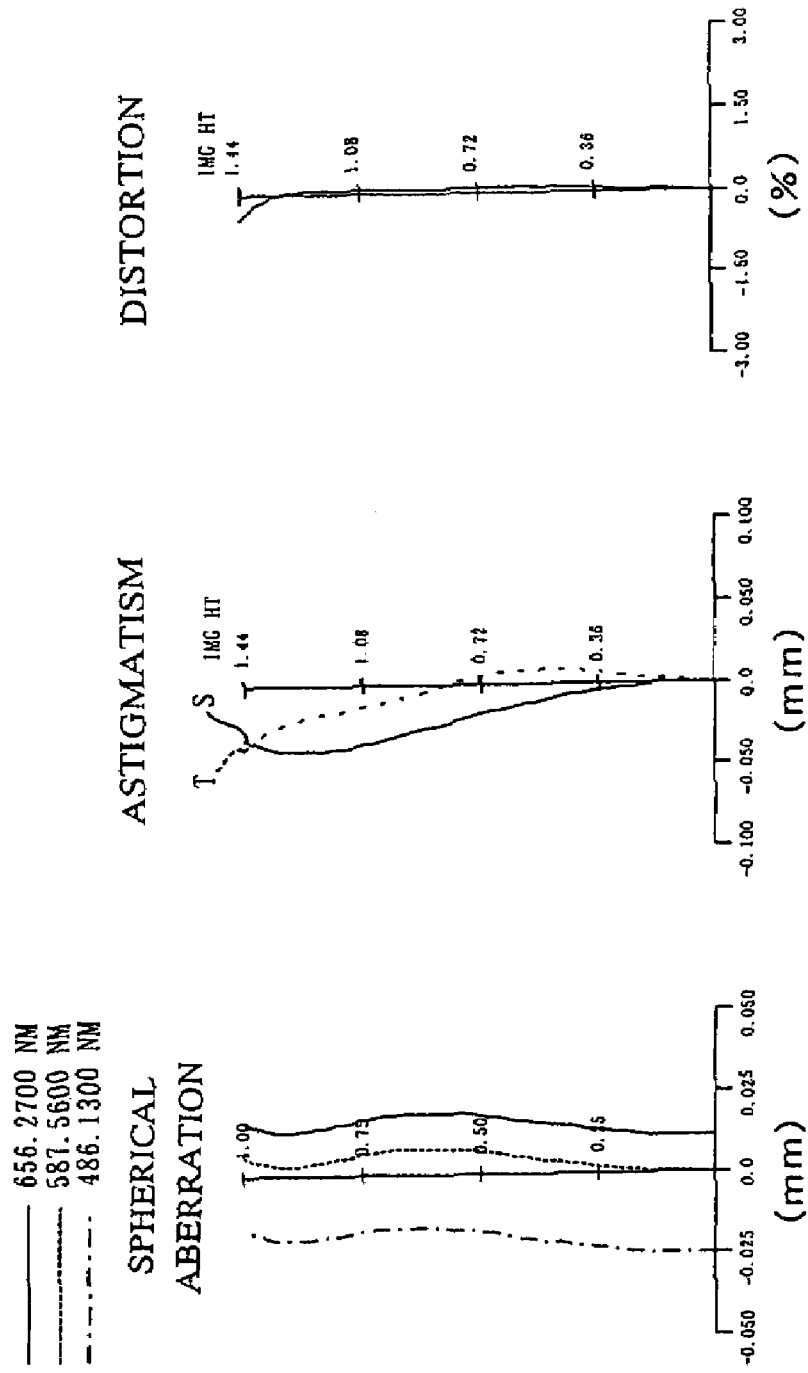
FIG. 7 shows graphs for describing the spherical aberration, astigmatism, and distortion of the imaging lens shown in FIG. 6.

FIG. 7 shows the spherical aberration, the astigmatism, and the distortion in the imaging lens 1 of the THIRD EXAMPLE.

According to the result, each of the spherical aberration, the astigmatism, and the distortion was almost satisfied. It can be seen from the result that a sufficiently excellent optical property can be obtained.

Fourth Example

Figure 8:
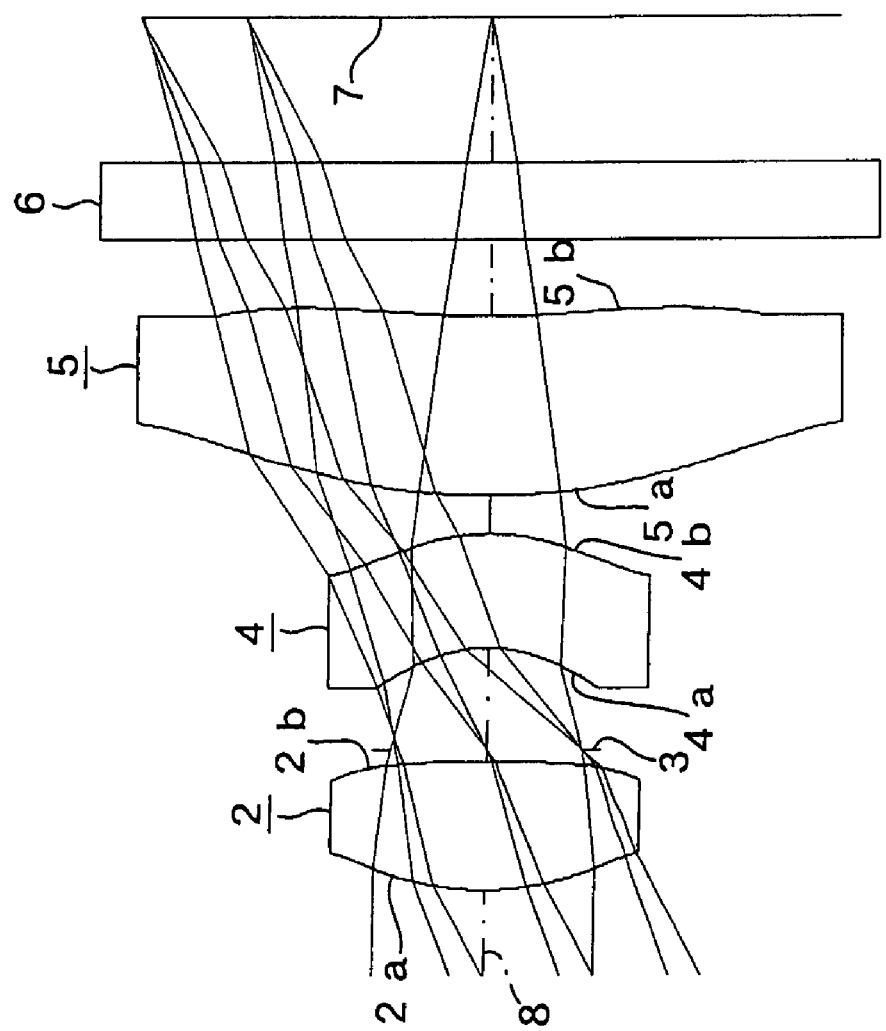
FIG. 8 is a schematic diagram for showing FOURTH EXAMPLE of the imaging lens according to the present invention.

FIG. 8 shows a FOURTH EXAMPLE of the present invention. The imaging lens 1 of the FOURTH EXAMPLE was set under the following conditions:

Lens Data
fl = 2.55 mm, $f_1$ = 2.07 mm, $f_2$ = −11.65 mm,
$f_3$ = 18.20 mm, F no = 2.8, ω = 58.8

| Face Number | r | d | nd | vd |
|---|---|---|---|---|
| (Object Point) | | | | |
| 1 (First Face of First Lens) | 1.190 | 0.50 | 1.5310 | 56 |
| 2 (Second Face of First Lens) | −12.194 | 0.05 | | |
| 3 (Diaphragm) | 0.000 | 0.40 | | |
| 4 (First Face of Second Lens) | −0.600 | 0.45 | 1.5850 | 30 |
| 5 (Second Face of Second Lens) | −0.840 | 0.15 | | |
| 6 (First Face of Third Lens) | 2.800 | 0.70 | 1.5310 | 56 |
| 7 (Second Face of Third Lens) | 3.600 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.6 | 1.0E−1 | −3.9E−1 | 6.0E−1 | −2.1 |
| 2 | 0 | −1.8E−1 | −6.8E−1 | 1.6E−1 | 1.1 |
| 4 | 2.8E−1 | 7.8E−1 | 3.3 | −9.8E+1 | 4.5E+1 |
| 5 | 5.5E−2 | 5.5E−1 | 7.1E−1 | −3.2E−1 | 5.6E−1 |
| 6 | 9.0E−1 | −1.5E−2 | −1.7E−2 | 9.1E−3 | −2.8E−3 |
| 7 | −6.4 | −1.9E−1 | 1.5E−1 | −7.2E−2 | 1.4E−2 |

Under such conditions, $f_1/fl=0.81$ was achieved, thereby satisfying the expression (1). $f_2/fl=-4.57$ was achieved, thereby satisfying the expression (2). $f_3/fl=7.14$ was achieved, thereby satisfying the expression (3). $r_1/r_2=-0.10$ was achieved, thereby satisfying the expression (4). $r_5/fl=1.10$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 9:
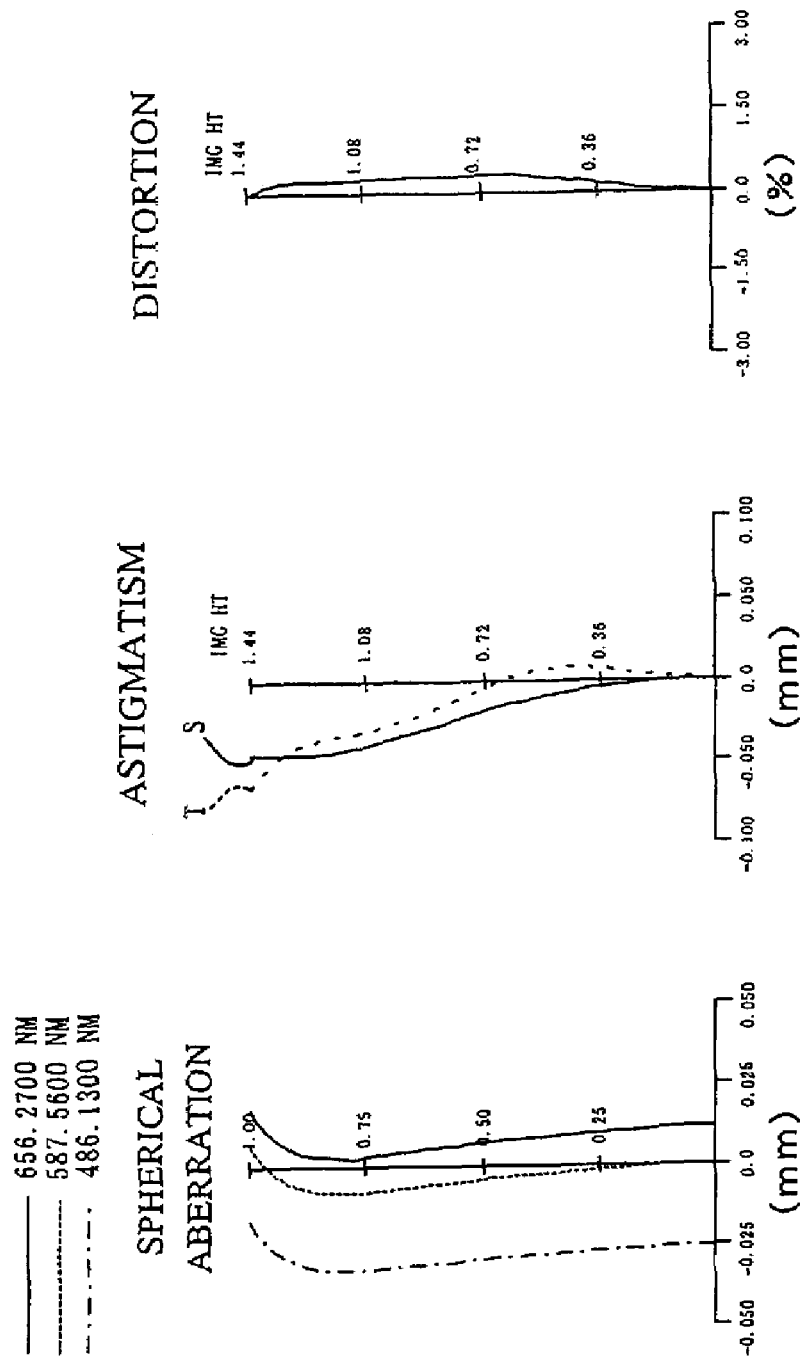
FIG. 9 shows graphs for describing the spherical aberration, astigmatism, and distortion of the imaging lens shown in FIG. 8.

FIG. 9 shows the spherical aberration, the astigmatism, and the distortion in the imaging lens 1 of the FOURTH EXAMPLE.

According to the result, each of the spherical aberration, the astigmatism, and the distortion was almost satisfied. It can be seen from the result that a sufficiently excellent optical property can be obtained.

Fifth Example

Figure 10:
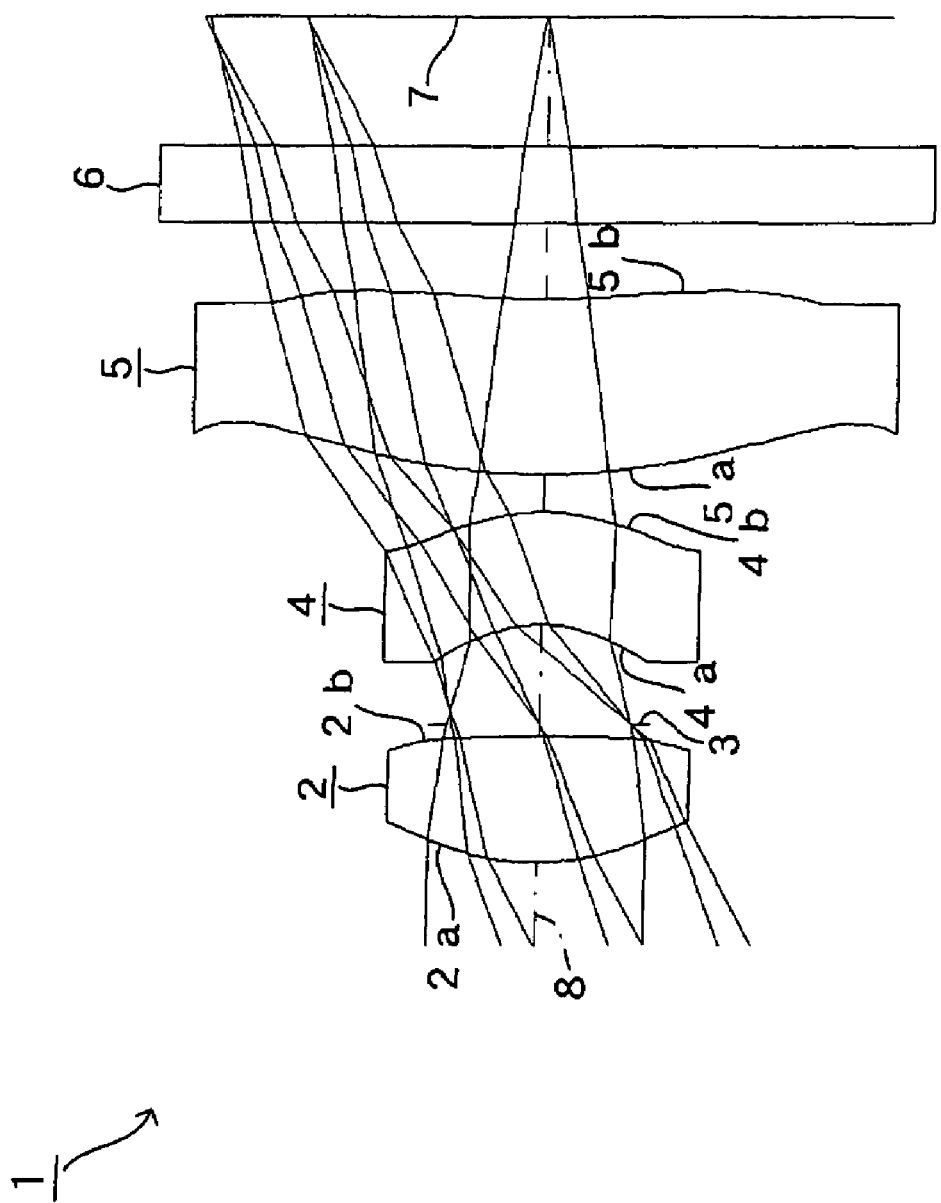
FIG. 10 is a schematic diagram for showing FIFTH EXAMPLE of the imaging lens according to the present invention.

FIG. 10 shows a FIFTH EXAMPLE of the present invention. The imaging lens 1 of the FIFTH EXAMPLE was set under the following conditions:

Lens Data
fl = 2.55 mm, $f_1$ = 2.03 mm, $f_2$ = −11.65 mm,
$f_3$ = 24.92 mm, F no = 2.8, ω = 58.5

| Face Number | r | d | nd | vd |
|---|---|---|---|---|
| (Object Point) | | | | |
| 1 (First Face of First Lens) | 1.116 | 0.50 | 1.5310 | 56 |
| 2 (Second Face of First Lens) | −25.905 | 0.05 | | |
| 3 (Diaphragm) | 0.000 | 0.40 | | |
| 4 (First Face of Second Lens) | −0.600 | 0.45 | 1.5850 | 30 |
| 5 (Second Face of Second Lens) | −0.840 | 0.15 | | |
| 6 (First Face of Third Lens) | 2.960 | 0.70 | 1.5310 | 56 |
| 7 (Second Face of Third Lens) | 3.500 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.3 | 1.2E−1 | −3.7E−1 | 6.4E−1 | −2.1 |
| 2 | 0 | −1.5E−1 | −8.5E−1 | 6.8E−1 | 1.1 |
| 4 | 3.2E−1 | 7.8E−1 | 3.3 | −8.9 | 4.5E+1 |
| 5 | 5.5E−2 | 5.8E−1 | 7.3E−1 | −3.5E−1 | 5.6E−1 |
| 6 | 9.0E−1 | −1.4E−2 | −1.7E−2 | 8.1E−3 | −4.4E−3 |
| 7 | −6.4 | −2.1E−1 | 1.6E−1 | −7.9E−2 | 1.2E−2 |

Under such conditions, $f_1/fl=0.80$ was achieved, thereby satisfying the expression (1). $f_2/fl=-4.57$ was achieved, thereby satisfying the expression (2). $f_3/fl=9.77$ was achieved, thereby satisfying the expression (3). $r_1/r_2=-0.04$ was achieved, thereby satisfying the expression (4). $r_5/fl=1.16$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 11:
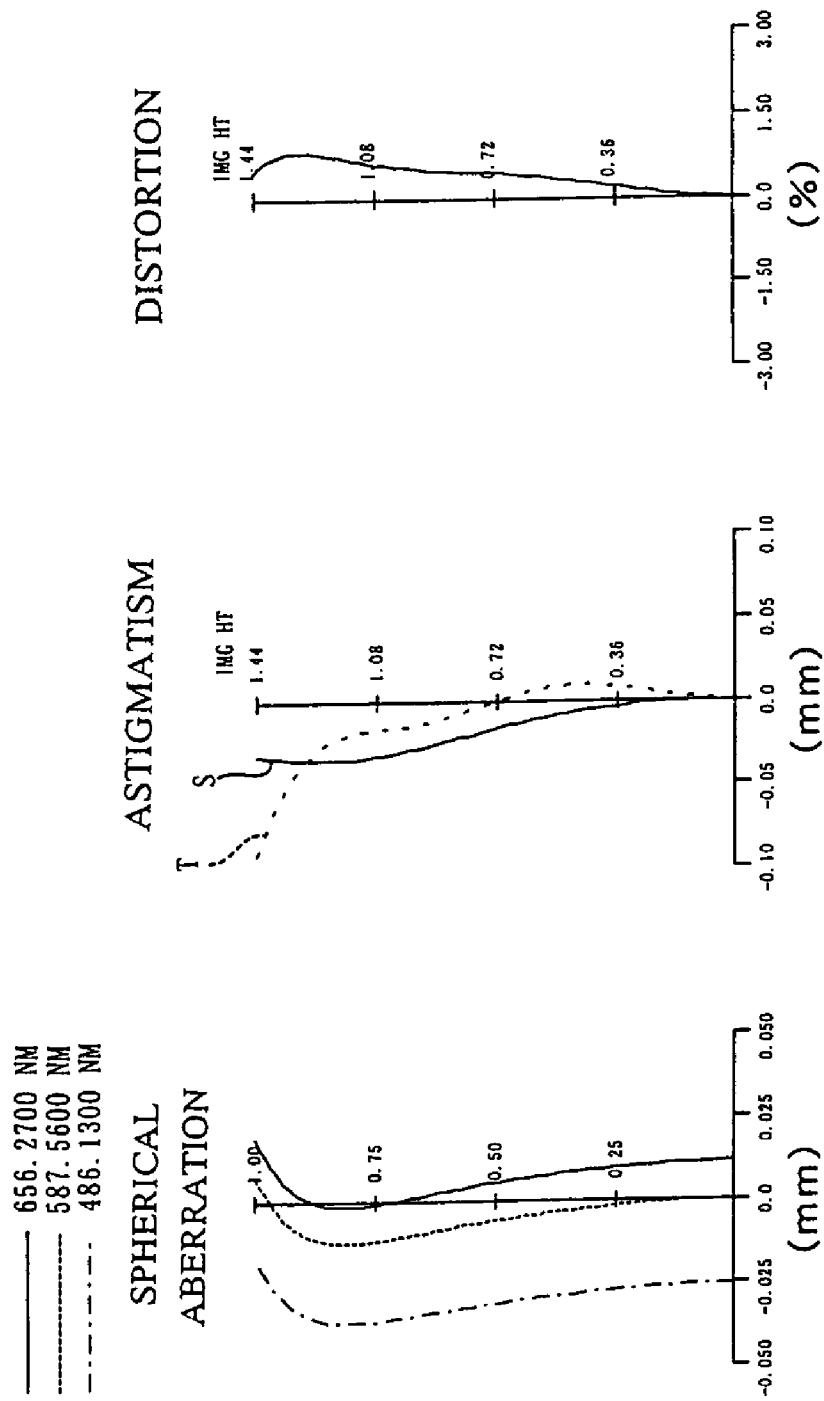
FIG. 11 shows graphs for describing the spherical aberration, astigmatism, and distortion of the imaging lens shown in FIG. 10.

FIG. 11 shows the spherical aberration, the astigmatism, and the distortion in the imaging lens 1 of the FIFTH EXAMPLE.

According to the result, each of the spherical aberration, the astigmatism, and the distortion was almost satisfied. It can be seen from the result that a sufficiently excellent optical property can be obtained.

Sixth Example

Figure 12:
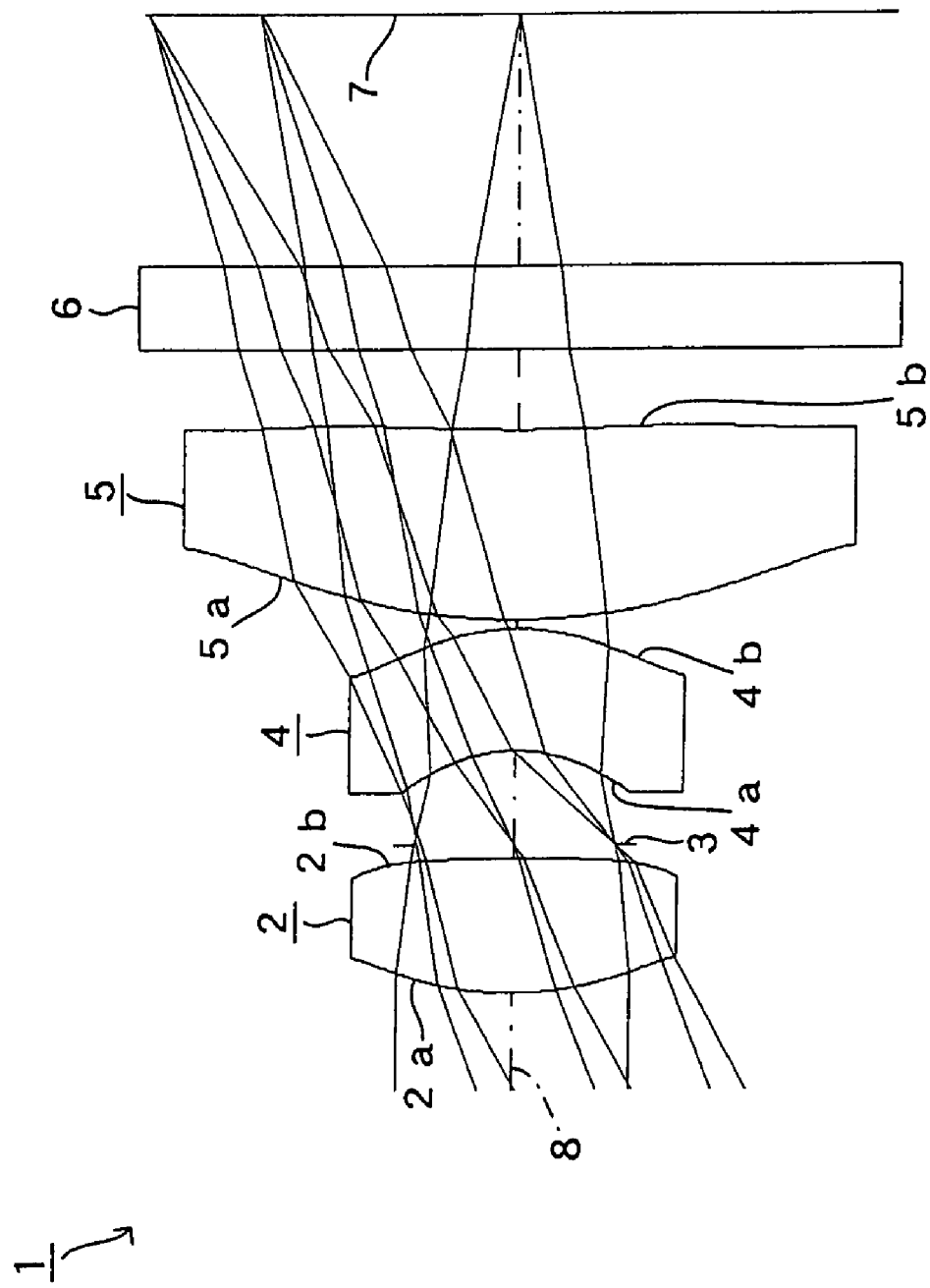
FIG. 12 is a schematic diagram for showing SIXTH EXAMPLE of the imaging lens according to the present invention.

FIG. 12 shows a SIXTH EXAMPLE of the present invention. The imaging lens 1 of the SIXTH EXAMPLE was set under the following conditions:

Lens Data
fl = 2.54 mm, $f_1$ = 2.37 mm, $f_2$ = −12.19 mm,
$f_3$ = 7.69 mm, F no = 2.8, ω = 59.6

| Face Number | r | d | nd | vd |
|---|---|---|---|---|
| (Object Point) | | | | |
| 1 (First Face of First Lens) | 1.325 | 0.50 | 1.5310 | 56 |
| 2 (Second Face of First Lens) | −22.222 | 0.05 | | |
| 3 (Diaphragm) | 0.000 | 0.34 | | |
| 4 (First Face of Second Lens) | −0.606 | 0.45 | 1.5850 | 30 |
| 5 (Second Face of Second Lens) | −0.844 | 0.03 | | |
| 6 (First Face of Third Lens) | 2.532 | 0.70 | 1.5310 | 56 |
| 7 (Second Face of Third Lens) | 6.028 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −2.0 | 9.4E−2 | −3.0E−1 | 6.5E−1 | −2.1 |
| 2 | 0 | −1.8E−1 | −5.5E−1 | −4.1E−1 | 1.1 |
| 4 | 2.8E−1 | 6.0E−1 | 4.1 | −1.2E+1 | 4.5E+1 |
| 5 | 5.5E−2 | 4.5E−1 | 7.3E−1 | −3.7E−1 | 5.6E−1 |
| 6 | 9.0E−1 | −9.9E−3 | −2.4E−2 | 1.2E−2 | −5.4E−3 |
| 7 | −6.4 | −1.6E−1 | 1.4E−1 | −7.2E−2 | 1.4E−2 |

Under such conditions, $f_1/fl$=0.93 was achieved, thereby satisfying the expression (1). $f_2/fl$=−4.80 was achieved, thereby satisfying the expression (2). $f_3/fl$=3.03 was achieved, thereby satisfying the expression (3). $r_1/r_2$=−0.06 was achieved, thereby satisfying the expression (4). $r_5/fl$=1.00 was achieved, thereby satisfying the expression (5). $v_1$=56 was achieved, thereby satisfying the expression (6). $v_2$=30 was achieved, thereby satisfying the expression (7). $v_3$=56 was achieved, thereby satisfying the expression (8).

Figure 13:
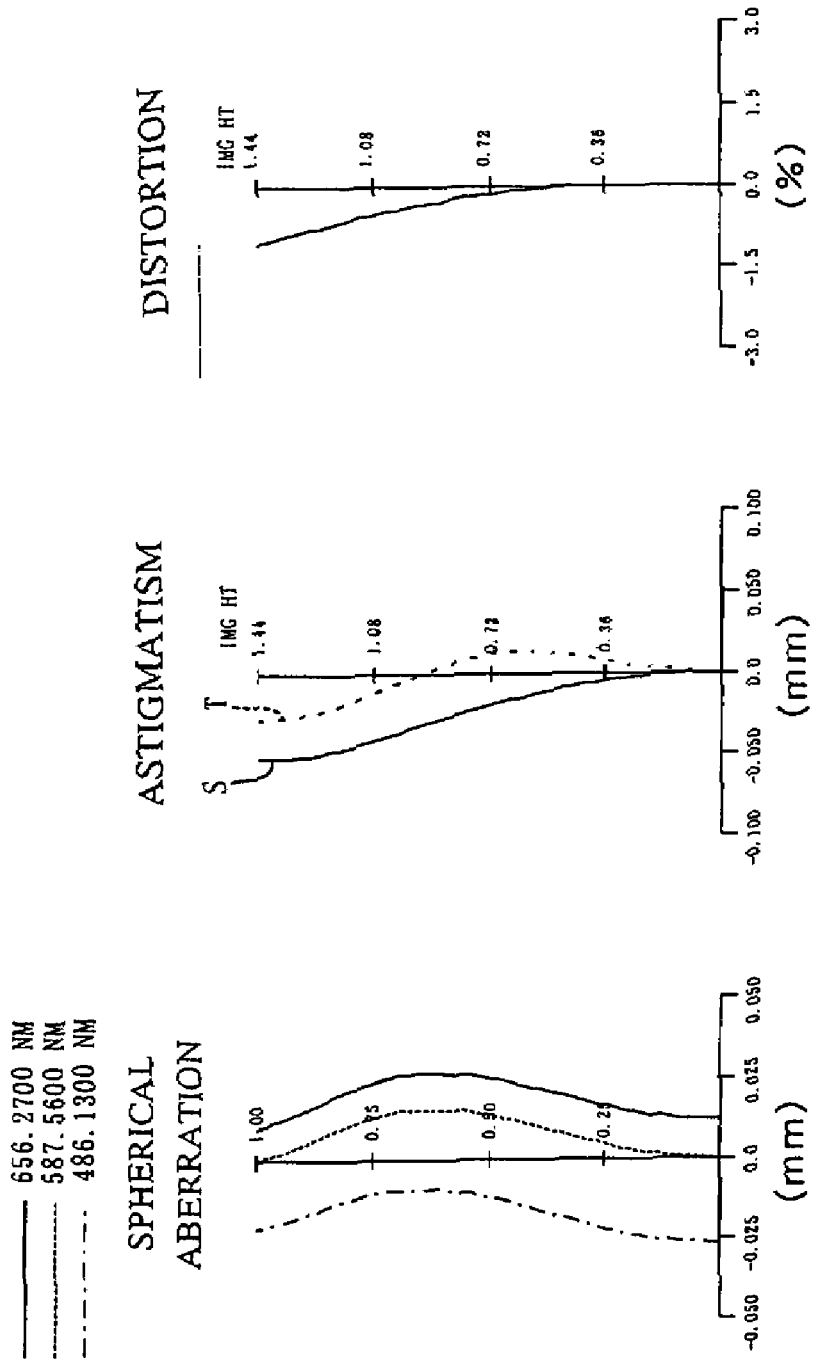
FIG. 13 shows graphs for describing the spherical aberration, astigmatism, and distortion of the imaging lens shown in FIG. 12.

FIG. 13 shows the spherical aberration, the astigmatism, and the distortion in the imaging lens 1 of the SIXTH EXAMPLE.

According to the result, each of the spherical aberration, the astigmatism, and the distortion was almost satisfied. It can be seen from the result that a sufficiently excellent optical property can be obtained.

Seventh Example

Figure 14:
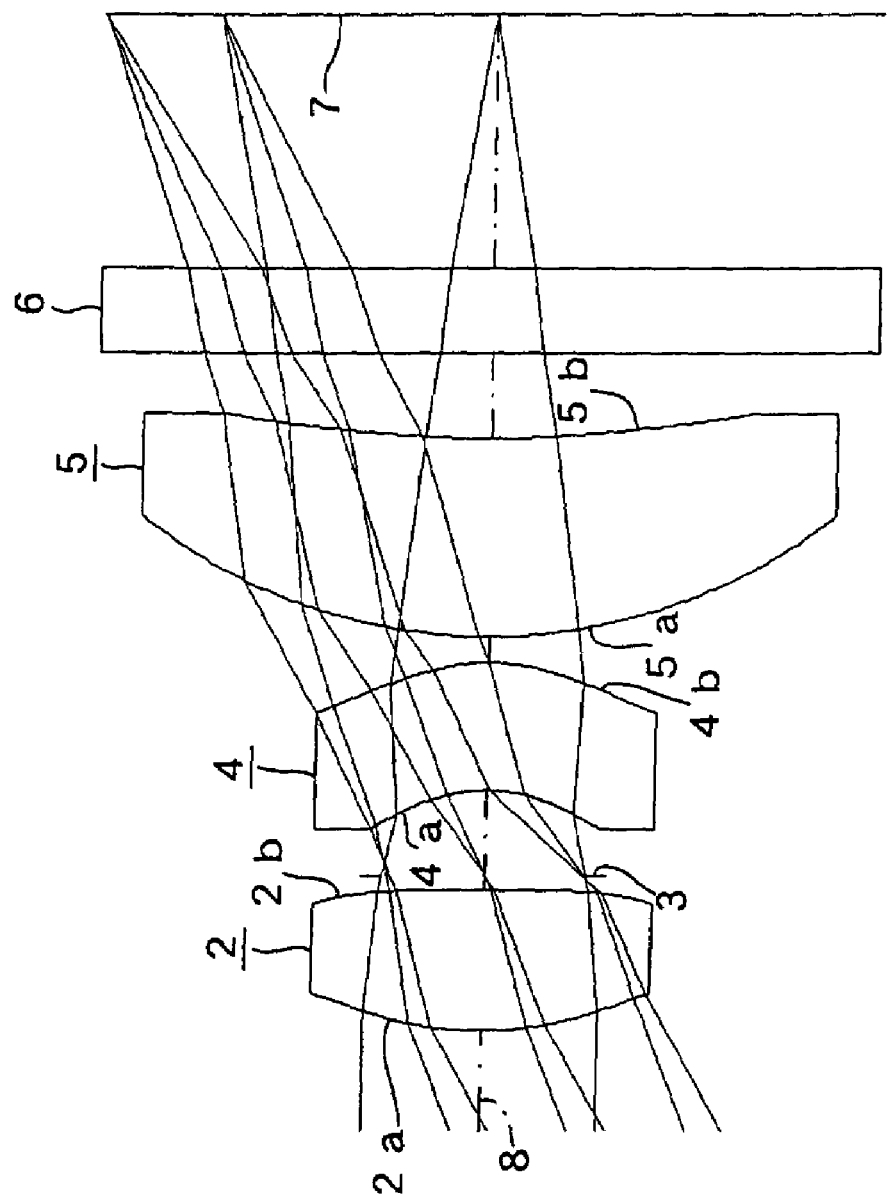
FIG. 14 is a schematic diagram for showing SEVENTH EXAMPLE of the imaging lens according to the present invention.

FIG. 14 shows a SEVENTH EXAMPLE of the present invention. The imaging lens 1 of the SEVENTH EXAMPLE was set under the following conditions:

Lens Data
fl = 2.47 mm, $f_1$ = 2.45 mm, $f_2$ = −14.64 mm,
$f_3$ = 7.46 mm, F no = 2.8, ω = 60.8

| Face Number | r | d | nd | vd |
|---|---|---|---|---|
| (Object Point) | | | | |
| 1 (First Face of First Lens) | 1.370 | 0.50 | 1.5310 | 56 |
| 2 (Second Face of First Lens) | −22.222 | 0.05 | | |
| 3 (Diaphragm) | 0.000 | 0.30 | | |
| 4 (First Face of Second Lens) | −0.617 | 0.45 | 1.5850 | 30 |
| 5 (Second Face of Second Lens) | −0.844 | 0.09 | | |
| 6 (First Face of Third Lens) | 2.000 | 0.70 | 1.5310 | 56 |
| 7 (Second Face of Third Lens) | 3.550 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.3 | 1.1E−1 | −4.4E−1 | 1.1 | −2.1 |
| 2 | 0 | −7.1E−2 | −8.1E−1 | 2.8E−1 | 1.1 |
| 4 | 4.3E−1 | 8.7E−1 | 2.7 | −5.6 | 4.5E+1 |
| 5 | 5.5E−2 | 4.6E−1 | 6.1E−1 | −3.1E−1 | 5.6E−1 |
| 6 | 7.6E−2 | −3.9E−2 | 2.2E−2 | −4.7E−3 | −5.3E−6 |
| 7 | −3.0E+1 | −7.3E−2 | 8.9E−2 | −2.8E−2 | 4.8E−3 |

Under such conditions, $f_1/fl$=0.99 was achieved, thereby satisfying the expression (1). $f_2/fl$=−5.93 was achieved, thereby satisfying the expression (2). $f_3/fl$=3.02 was achieved, thereby satisfying the expression (3). $r_1/r_2$=−0.06 was achieved, thereby satisfying the expression (4). $r_5/fl$=0.81 was achieved, thereby satisfying the expression (5). $v_1$=56 was achieved, thereby satisfying the expression (6). $v_2$=30 was achieved, thereby satisfying the expression (7). $v_3$=56 was achieved, thereby satisfying the expression (8).

Figure 15:
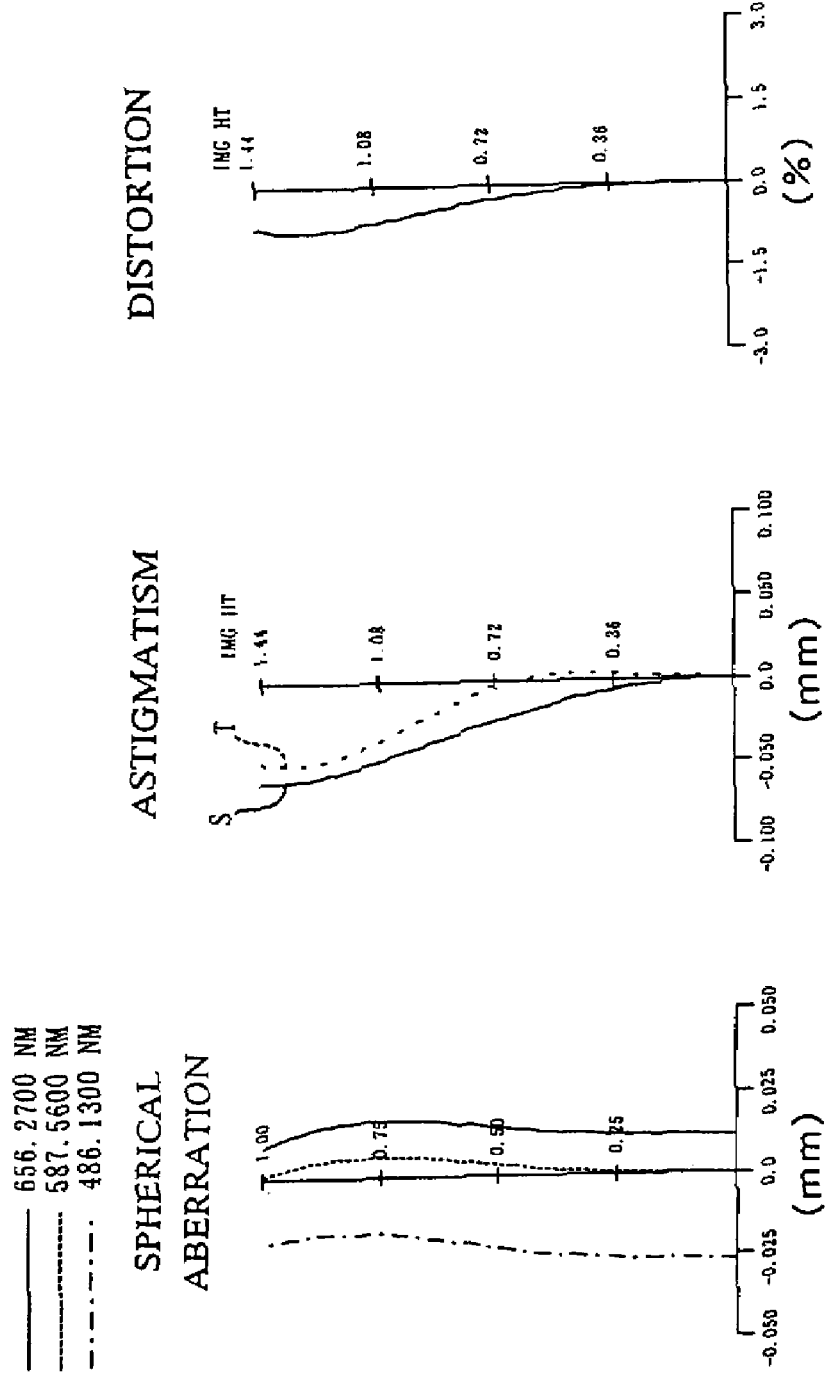
FIG. 15 shows graphs for describing the spherical aberration, astigmatism, and distortion of the imaging lens shown in FIG. 14.

FIG. 15 shows the spherical aberration, the astigmatism, and the distortion in the imaging lens 1 of the SEVENTH EXAMPLE.

According to the result, each of the spherical aberration, the astigmatism, and the distortion was almost satisfied. It can be seen from the result that a sufficiently excellent optical property can be obtained.

Eighth Example

Figure 16:
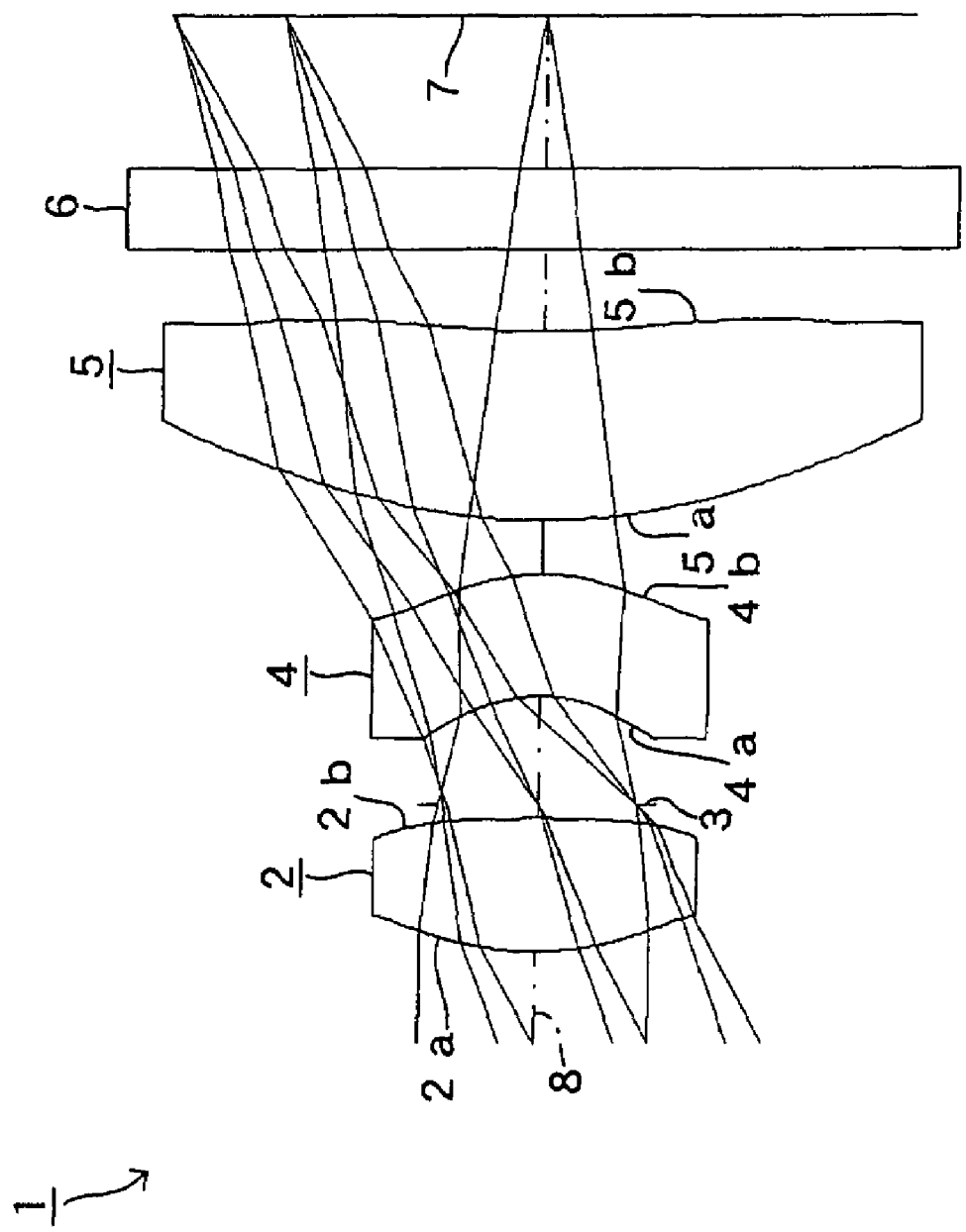
FIG. 16 is a schematic diagram for showing EIGHTH EXAMPLE of the imaging lens according to the present invention.

FIG. 16 shows an EIGHTH EXAMPLE of the present invention. The imaging lens 1 of the EIGHTH EXAMPLE was set under the following conditions:

Lens Data
fl = 2.54 mm, $f_1$ = 2.12 mm, $f_2$ = −12.19 mm,
$f_3$ = 14.68 mm, F no = 2.8, ω = 59.1

| Face Number | r | d | nd | vd |
|---|---|---|---|---|
| (Object Point) | | | | |
| 1 (First Face of First Lens) | 1.275 | 0.50 | 1.5310 | 56 |
| 2 (Second Face of First Lens) | −8.307 | 0.05 | | |
| 3 (Diaphragm) | 0.000 | 0.40 | | |
| 4 (First Face of Second Lens) | −0.606 | 0.45 | 1.5850 | 30 |
| 5 (Second Face of Second Lens) | −0.844 | 0.20 | | |
| 6 (First Face of Third Lens) | 2.532 | 0.70 | 1.5310 | 56 |
| 7 (Second Face of Third Lens) | 3.390 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.9 | 8.9E−2 | −3.8E−1 | 7.0E−1 | −2.1 |
| 2 | 0 | −1.7E−1 | −4.9E−1 | −2.8E−1 | 1.1 |
| 4 | 2.7E−1 | 7.5E−1 | 3.7 | −1.1E+1 | 4.5E+1 |
| 5 | 5.5E−2 | 5.1E−1 | 7.4E−1 | −3.6E−1 | 5.6E−1 |
| 6 | 9.0E−1 | −2.1E−2 | −2.0E−2 | 8.2E−3 | −1.0E−3 |
| 7 | −6.4 | −1.7E−1 | 1.4E−1 | −7.2E−2 | 1.5E−2 |

Under such conditions, $f_1/fl=0.83$ was achieved, thereby satisfying the expression (1). $f_2/fl=-4.80$ was achieved, thereby satisfying the expression (2). $f_3/fl=5.78$ was achieved, thereby satisfying the expression (3). $r_1/r_2=-0.15$ was achieved, thereby satisfying the expression (4). $r_5/fl=1.00$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 17:
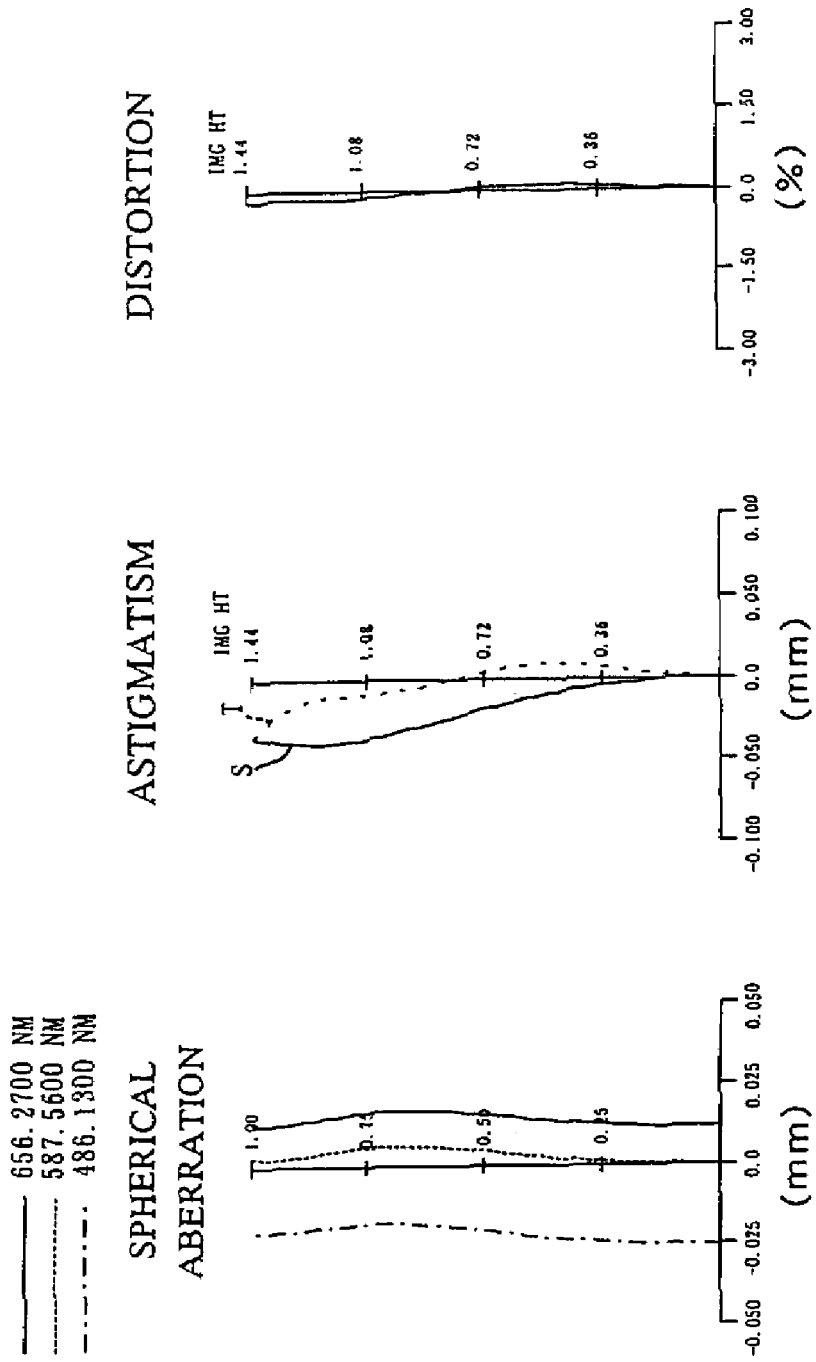
FIG. 17 shows graphs for describing the spherical aberration, astigmatism, and distortion of the imaging lens shown in FIG. 16.

FIG. 17 shows the spherical aberration, the astigmatism, and the distortion in the imaging lens 1 of the EIGHTH EXAMPLE.

According to the result, each of the spherical aberration, the astigmatism, and the distortion was almost satisfied. It can be seen from the result that a sufficiently excellent optical property can be obtained.

Ninth Example

Figure 18:
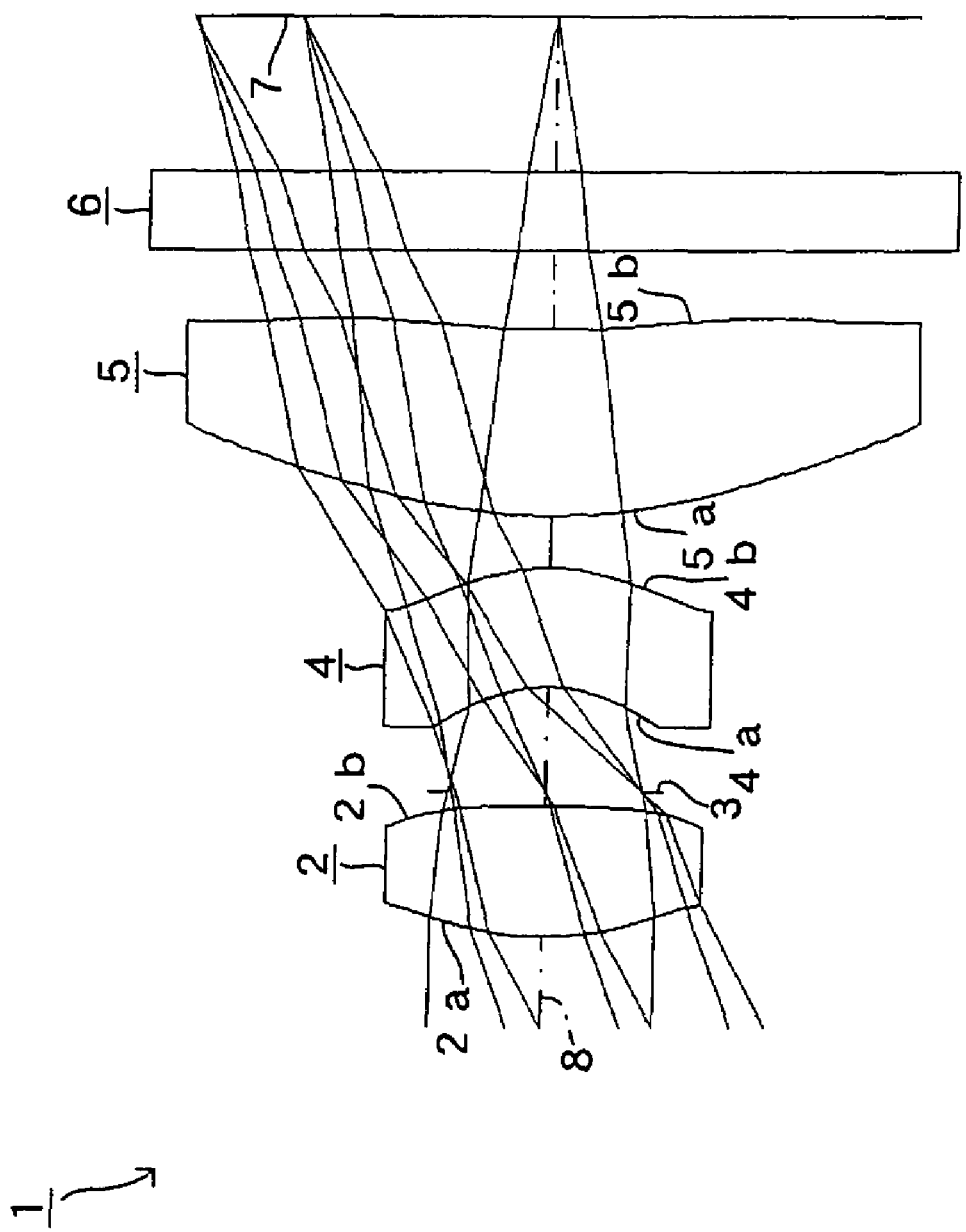
FIG. 18 is a schematic diagram for showing NINTH EXAMPLE of the imaging lens according to the present invention.

FIG. 18 shows a NINTH EXAMPLE of the present invention. The imaging lens 1 of the NINTH EXAMPLE was set under the following conditions:

Lens Data
fl = 2.54 mm, $f_1$ = 2.12 mm, $f_2$ = -12.19 mm,
$f_3$ = 14.68 mm, F no = 2.8, ω = 59.1

| Face Number | r | d | nd | vd |
|---|---|---|---|---|
| (Object Point) | | | | |
| 1 (First Face of First Lens) | 1.330 | 0.50 | 1.5310 | 56 |
| 2 (Second Face of First Lens) | -6.374 | 0.05 | | |
| 3 (Diaphragm) | 0.000 | 0.40 | | |
| 4 (First Face of Second Lens) | -0.606 | 0.45 | 1.5850 | 30 |
| 5 (Second Face of Second Lens) | -0.844 | 0.20 | | |
| 6 (First Face of Third Lens) | 2.532 | 0.70 | 1.5310 | 56 |
| 7 (Second Face of Third Lens) | 3.390 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | -2.2 | 7.8E-2 | -4.0E-1 | 6.9E-1 | -2.1 |
| 2 | 0 | -1.8E-1 | -4.9E-1 | -2.6E-1 | 1.1 |
| 4 | 2.6E-1 | 7.8E-1 | 3.7 | -1.1E+1 | 4.5E+1 |
| 5 | 5.5E-2 | 5.2E-1 | 7.4E-1 | -3.7E-1 | 5.6E-1 |
| 6 | 9.0E-1 | -2.1E-2 | -2.1E-2 | 7.9E-3 | -8.8E-4 |
| 7 | -6.4 | -1.7E-1 | 1.3E-1 | -7.2E-2 | 1.5E-2 |

Under such conditions, $f_1/fl=0.83$ was achieved, thereby satisfying the expression (1). $f_2/fl=-4.80$ was achieved, thereby satisfying the expression (2). $f_3/fl=5.78$ was achieved, thereby satisfying the expression (3). $r_1/r_2=-0.21$ was achieved, thereby satisfying the expression (4). $r_5/fl=1.00$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 19:
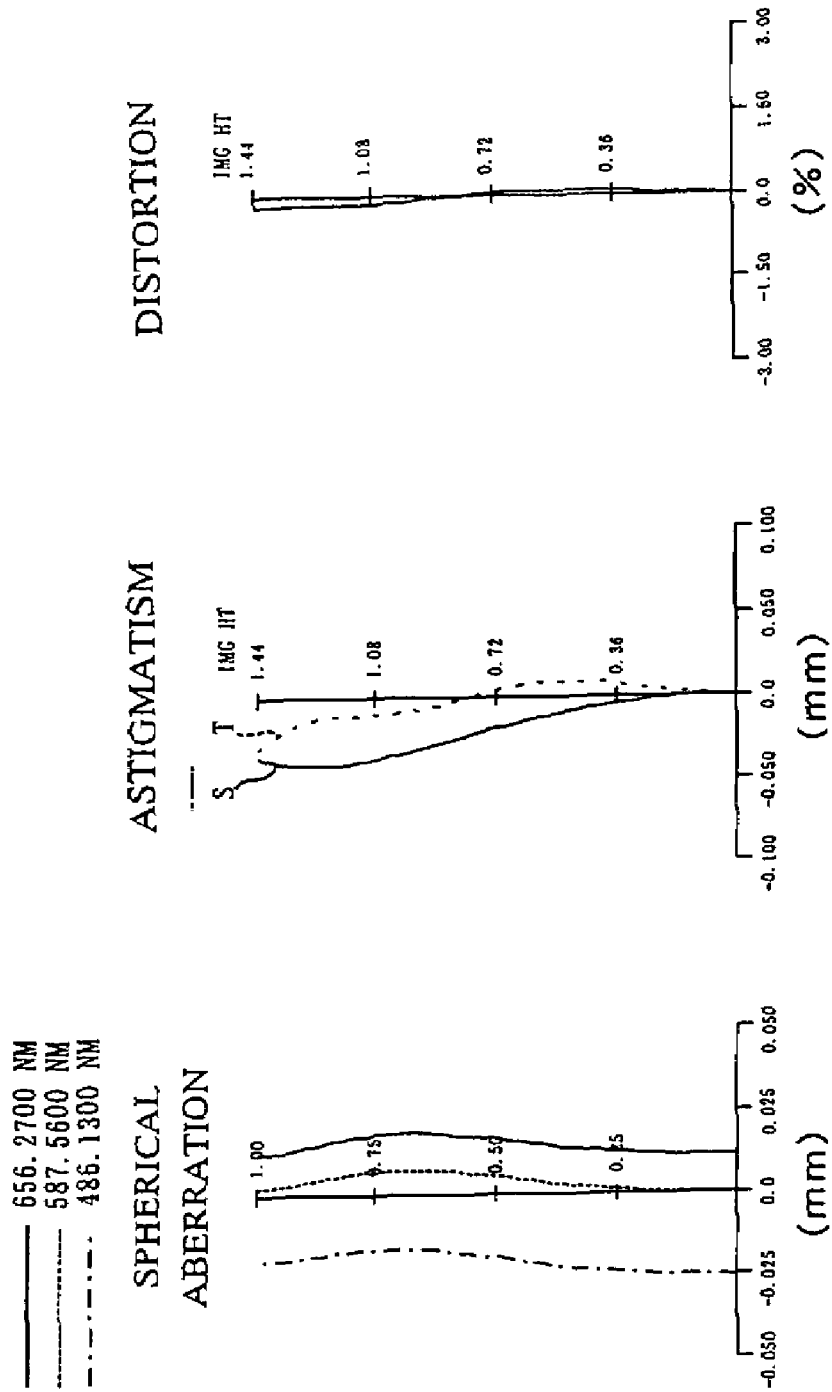
FIG. 19 shows graphs for describing the spherical aberration, astigmatism, and distortion of the imaging lens shown in FIG. 18.

FIG. 19 shows the spherical aberration, the astigmatism, and the distortion in the imaging lens 1 of the NINTH EXAMPLE.

According to the result, each of the spherical aberration, the astigmatism, and the distortion was almost satisfied. It can be seen from the result that a sufficiently excellent optical property can be obtained.

Tenth Example

Figure 20:
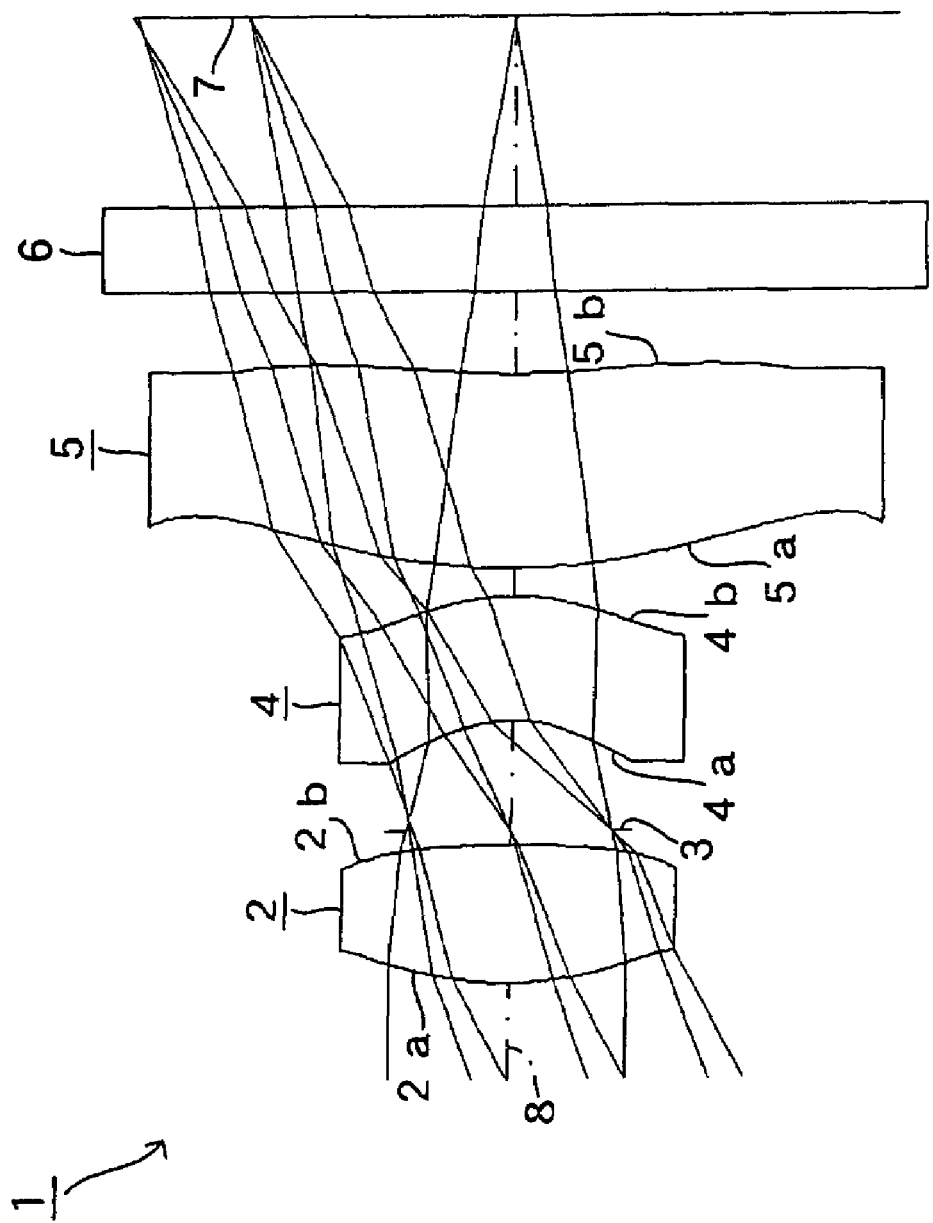
FIG. 20 is a schematic diagram for showing TENTH EXAMPLE of the imaging lens according to the present invention.

FIG. 20 shows a TENTH EXAMPLE of the present invention. The imaging lens 1 of the TENTH EXAMPLE was set under the following conditions:

Lens Data
fl = 2.54 mm, $f_1$ = 2.12 mm, $f_2$ = -12.19 mm,
$f_3$ = 15.91 mm, F no = 2.8, ω = 59.0

| Face Number | r | d | nd | vd |
|---|---|---|---|---|
| (Object Point) | | | | |
| 1 (First Face of First Lens) | 1.400 | 0.50 | 1.5310 | 56 |
| 2 (Second Face of First Lens) | -5.000 | 0.05 | | |
| 3 (Diaphragm) | 0.000 | 0.40 | | |
| 4 (First Face of Second Lens) | -0.606 | 0.45 | 1.5850 | 30 |
| 5 (Second Face of Second Lens) | -0.844 | 0.10 | | |
| 6 (First Face of Third Lens) | 2.532 | 0.70 | 1.5310 | 56 |
| 7 (Second Face of Third Lens) | 3.268 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | -1.7 | 7.3E-2 | -6.2E-1 | 1.1 | -2.1 |
| 2 | 0 | -9.7E-2 | -7.1E-1 | 8.3E-2 | 1.1 |
| 4 | 2.6E-1 | 1.1 | 2.9 | -9.3 | 4.5E+1 |
| 5 | 5.5E-2 | 6.1E-1 | 8.6E-1 | -6.5E-1 | 5.6E-1 |
| 6 | 9.0E-1 | -4.2E-2 | -5.9E-3 | 8.7E-4 | -4.6E-3 |
| 7 | -6.4 | -2.3E-1 | 1.9E-1 | -9.3E-2 | 1.5E-2 |

Under such conditions, $f_1/fl=0.83$ was achieved, thereby satisfying the expression (1). $f_2/fl=-4.80$ was achieved, thereby satisfying the expression (2). $f_3/fl=6.26$ was achieved, thereby satisfying the expression (3). $r_1/r_2=-0.28$ was achieved, thereby satisfying the expression (4). $r_5/fl=1.00$ was achieved, thereby satisfying the expression (5). $v_1=56$ was achieved, thereby satisfying the expression (6). $v_2=30$ was achieved, thereby satisfying the expression (7). $v_3=56$ was achieved, thereby satisfying the expression (8).

Figure 21:
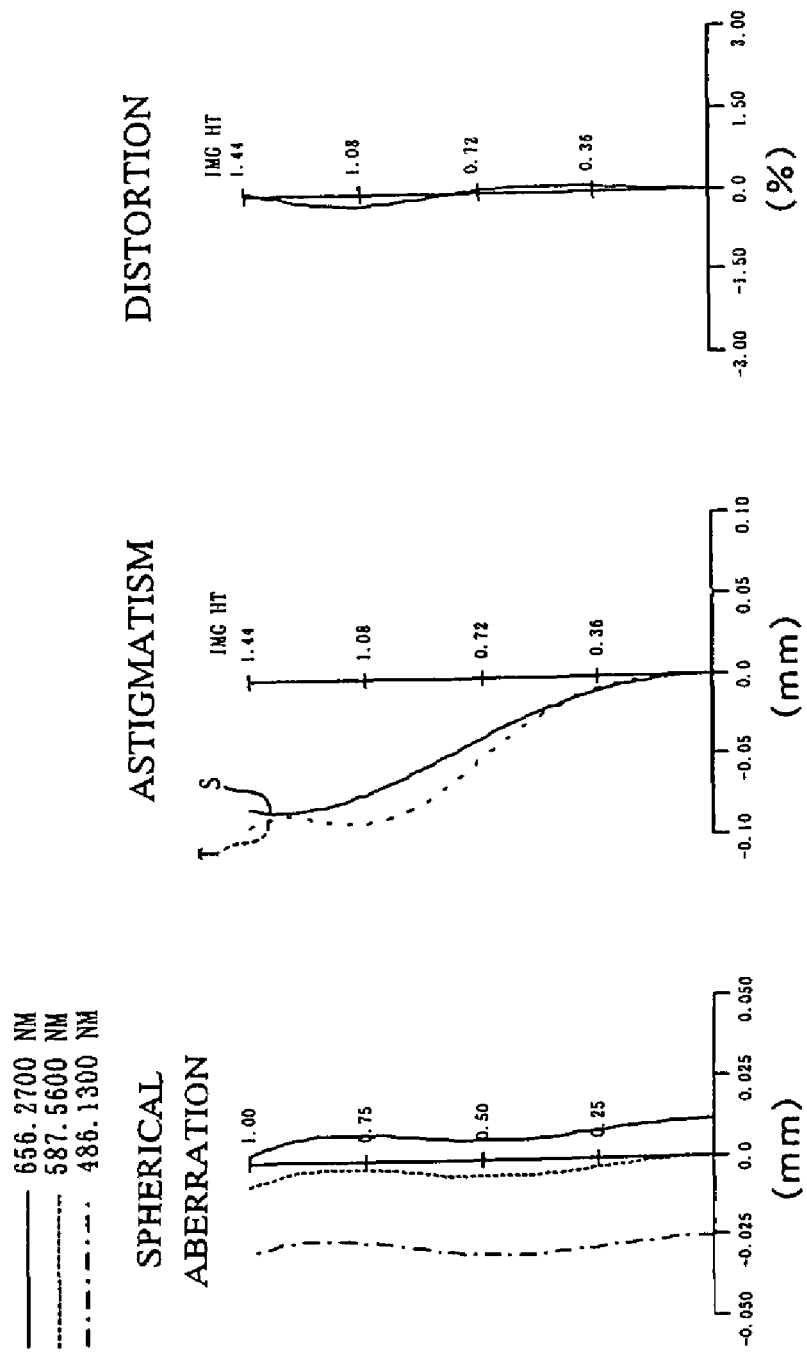
FIG. 21 shows graphs for describing the spherical aberration, astigmatism, and distortion of the imaging lens shown in FIG. 20.

FIG. 21 shows the spherical aberration, the astigmatism, and the distortion in the imaging lens 1 of the TENTH EXAMPLE.

According to the result, each of the spherical aberration, the astigmatism, and the distortion was almost satisfied. It can be seen from the result that a sufficiently excellent optical property can be obtained.

Eleventh Example

Figure 22:
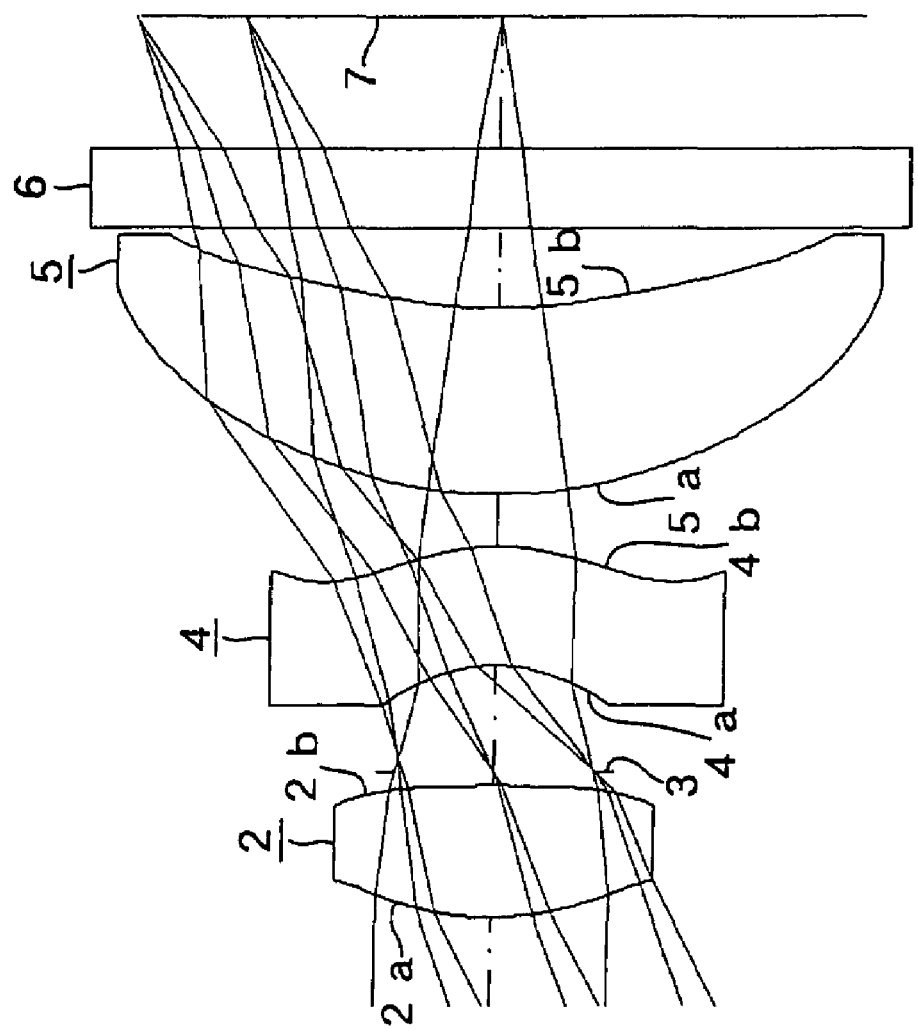
FIG. 22 is a schematic diagram for showing ELEVENTH EXAMPLE of the imaging lens according to the present invention.

FIG. 22 shows an ELEVENTH EXAMPLE of the present invention. The imaging lens 1 of the ELEVENTH EXAMPLE was set under the following conditions:

Lens Data
fl = 2.60 mm, $f_1$ = 2.06 mm, $f_2$ = -7.48 mm,
$f_3$ = 18.35, F no = 2.8, ω = 57.5

| Face Number | r | d | nd | vd |
|---|---|---|---|---|
| (Object Point) | | | | |
| 1 (First Face of First Lens) | 1.201 | 0.50 | 1.5310 | 56 |
| 2 (Second Face of First Lens) | -10.351 | 0.05 | | |
| 3 (Diaphragm) | 0.000 | 0.40 | | |
| 4 (First Face of Second Lens) | -0.639 | 0.45 | 1.5850 | 30 |

-continued

Lens Data
fl = 2.60 mm, $f_1$ = 2.06 mm, $f_2$ = −7.48 mm,
$f_3$ = 18.35, F no = 2.8, ω = 57.5

| | | | | |
|---|---|---|---|---|
| 5 (Second Face of Second Lens) | −0.943 | 0.20 | | |
| 6 (First Face of Third Lens) | 1.983 | 0.70 | 1.5310 | 56 |
| 7 (Second Face of Third Lens) | 2.184 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −2.1 | 9.1E−2 | −2.9E−1 | 4.0E−1 | −2.0 |
| 2 | 0 | −2.0E−1 | −4.5E−1 | −4.6E−1 | 1.3 |
| 4 | 3.1E−1 | 7.1E−1 | 3.5 | −1.2E+1 | 3.6E+1 |
| 5 | −4.1E−2 | 4.8E−1 | 6.9E−1 | −5.2E−1 | 2.3E−1 |
| 6 | 6.3E−1 | −2.3E−2 | −7.0E−3 | 4.7E−3 | −1.4E−3 |
| 7 | −2.6 | −1.4E−1 | 1.4E−1 | −7.1E−2 | 1.7E−2 |

Under such conditions, $f_1/fl$=0.79 was achieved, thereby satisfying the expression (1). $f_2/fl$=−2.88 was achieved, thereby satisfying the expression (2). $f_3/fl$=7.06 was achieved, thereby satisfying the expression (3). $r_1/r_2$=−0.12 was achieved, thereby satisfying the expression (4). $r_5/fl$=0.76 was achieved, thereby satisfying the expression (5). $v_1$=56 was achieved, thereby satisfying the expression (6). $v_2$=30 was achieved, thereby satisfying the expression (7). $v_3$=56 was achieved, thereby satisfying the expression (8).

Figure 23:
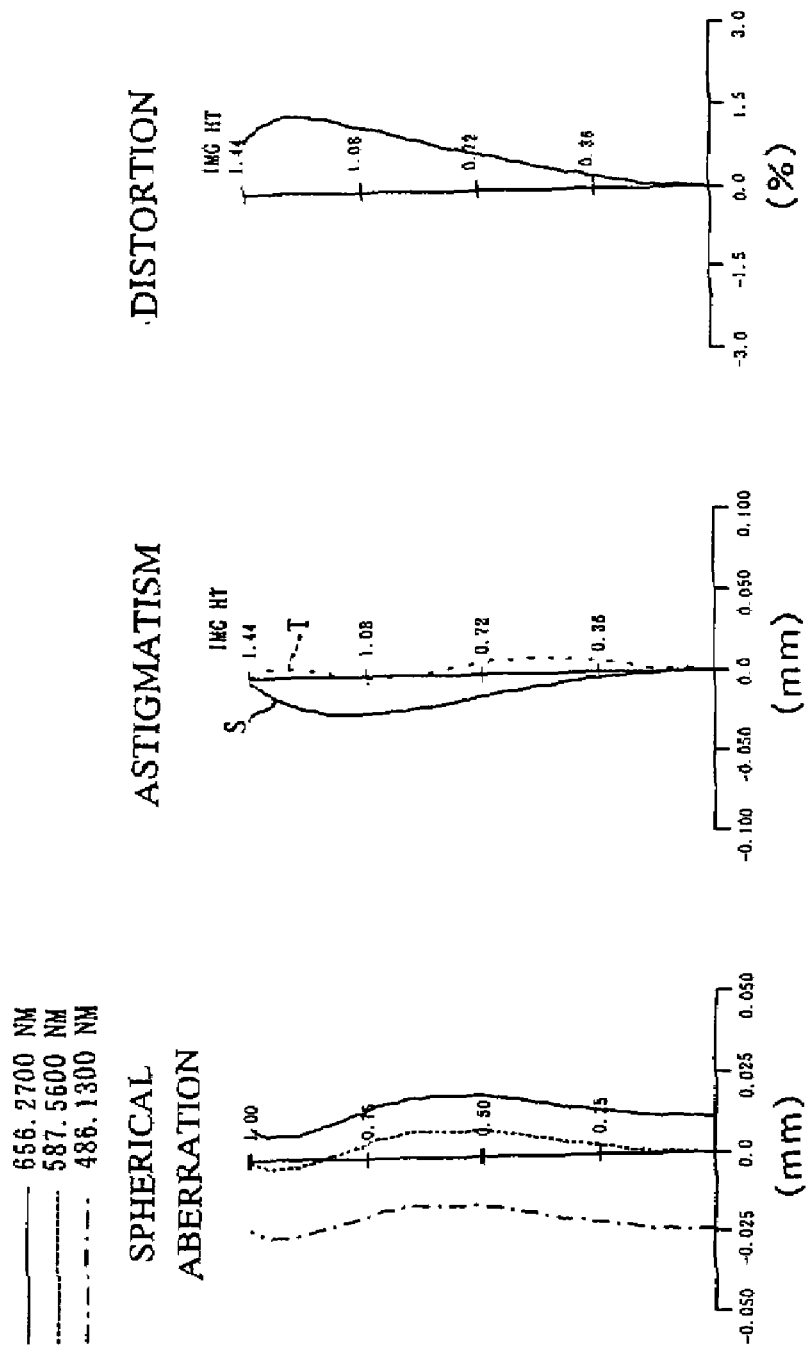
FIG. 23 shows graphs for describing the spherical aberration, astigmatism, and distortion of the imaging lens shown in FIG. 22.

FIG. 23 shows the spherical aberration, the astigmatism, and the distortion in the imaging lens 1 of the ELEVENTH EXAMPLE.

According to the result, each of the spherical aberration, the astigmatism, and the distortion was almost satisfied. It can be seen from the result that a sufficiently excellent optical property can be obtained.

Twelfth Example

Figure 24:
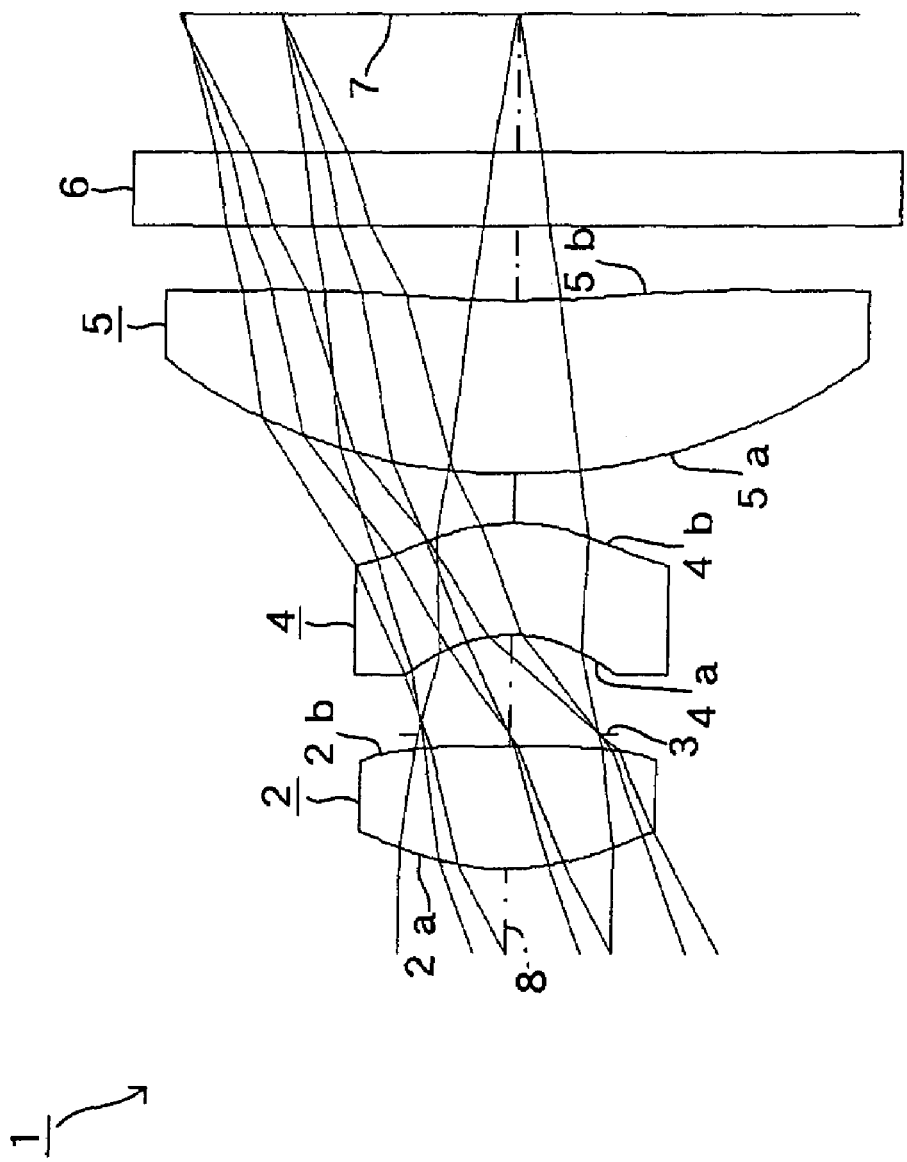
FIG. 24 is a schematic diagram for showing TWELFTH EXAMPLE of the imaging lens according to the present invention.

FIG. 24 shows a TWELFTH EXAMPLE of the present invention. The imaging lens 1 of the TWELFTH EXAMPLE was set under the following conditions:

Lens Data
fl = 2.55 mm, $f_1$ = 2.12 mm, $f_2$ = −10.66 mm,
$f_3$ = 11.75, F no = 2.8, ω = 58.8

| Face Number | r | d | nd | vd |
|---|---|---|---|---|
| (Object Point) | | | | |
| 1 (First Face of First Lens) | 1.176 | 0.50 | 1.5310 | 56 |
| 2 (Second Face of First Lens) | −22.222 | 0.05 | | |
| 3 (Diaphragm) | 0.000 | 0.40 | | |
| 4 (First Face of Second Lens) | −0.597 | 0.45 | 1.5850 | 30 |
| 5 (Second Face of Second Lens) | −0.844 | 0.20 | | |
| 6 (First Face of Third Lens) | 2.532 | 0.70 | 1.5310 | 56 |
| 7 (Second Face of Third Lens) | 3.851 | 0.30 | | |
| 8 (First Face of Cover Glass) | 0.000 | 0.30 | 1.5168 | 64 |
| 9 (Second Face of Cover Glass) (Image Surface) | 0.000 | | | |

| Face Number | k | A | B | C | D |
|---|---|---|---|---|---|
| 1 | −1.5 | 1.1E−1 | −3.5E−1 | 6.7E−1 | −2.1 |
| 2 | 0 | −1.6E−1 | −5.7E−1 | −1.7E−1 | 1.1 |
| 4 | 2.7E−1 | 6.9E−1 | 3.7 | −1.0E+1 | 4.5E+1 |
| 5 | 5.5E−2 | 5.0E−1 | 7.0E−1 | −3.4E−1 | 5.6E−1 |
| 6 | 9.0E−1 | −2.3E−3 | −2.1E−2 | 8.4E−3 | −1.0E−3 |
| 7 | −6.4 | −1.6E−1 | 1.4E−1 | −7.1E−2 | 1.5E−2 |

Under such conditions, $f_1/fl$=0.83 was achieved, thereby satisfying the expression (1). $f_2/fl$=−4.18 was achieved, thereby satisfying the expression (2). $f_3/fl$=4.61 was achieved, thereby satisfying the expression (3). $r_1/r_2$=−0.05 was achieved, thereby satisfying the expression (4). $r_5/fl$=0.99 was achieved, thereby satisfying the expression (5). $v_1$=56 was achieved, thereby satisfying the expression (6). $v_2$=30 was achieved, thereby satisfying the expression (7). $v_3$=56 was achieved, thereby satisfying the expression (8).

Figure 25:
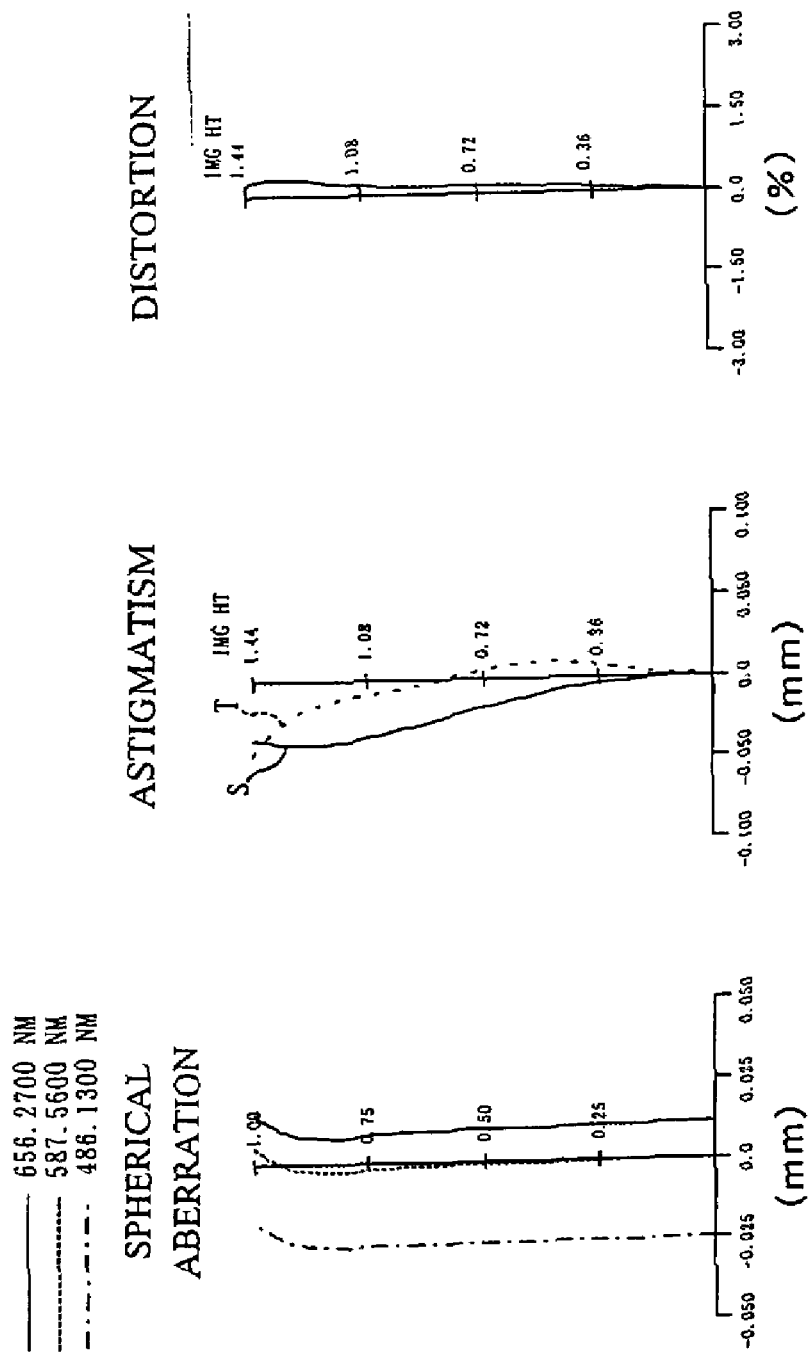
FIG. 25 shows graphs for describing the spherical aberration, astigmatism, and distortion of the imaging lens shown in FIG. 24.

FIG. 25 shows the spherical aberration, the astigmatism, and the distortion in the imaging lens 1 of the TWELFTH EXAMPLE.

According to the result, each of the spherical aberration, the astigmatism, and the distortion was almost satisfied. It can be seen from the result that a sufficiently excellent optical property can be obtained.

The present invention is not limited to the above-described embodiments and EXAMPLES, and various modifications are possible as required.

What is claimed is:

1. An imaging lens, comprising:
in order from an object side towards an image surface side, a first lens which is a biconvex lens, a diaphragm, a second lens which is a meniscus lens having a negative power whose convex surface faces the image surface side, and a third lens which is a meniscus lens having a positive power whose convex surface faces the object side, wherein conditions expressed by each of following expressions (1) to (3) are to be satisfied:

$$0.7 \leq f_1/fl \leq 1 \quad (1)$$

$$-6 \leq f_2/fl \leq -2.8 \quad (2)$$

$$3 \leq f_3/fl \leq 10 \quad (3)$$

where,
fl: focal distance of the entire lens system
$f_1$: focal distance of the first lens
$f_2$: focal distance of the second lens
$f_3$: focal distance of the third lens.

2. The imaging lens according to claim 1, wherein:
a condition expressed by a following expression (4) is to be further satisfied:

$$-0.3 \leq r_1/r_2 < 0 \quad (4)$$

where,
$r_1$: center radius curvature of the object side face of the first lens
$r_2$: center radius curvature of the imaging surface side face of the first lens.

3. The imaging lens according to claim 1, wherein:
a condition expressed by a following expression (5) is to be further satisfied:

$$0.7 \leq r_5/fl \leq 1.2 \quad (5)$$

where,
$r_5$: center radius curvature of the object side face of the third lens.

4. The imaging lens according to any one of claim 1, wherein:

conditions expressed by each of following expressions (6) to (8) are to be further satisfied:

$$v_1 \geq 50 \quad (6)$$

$$v_2 \leq 40 \quad (7)$$

$$v_3 \geq 50 \quad (8)$$

where,
$v_1$: Abbe number of the first lens
$v_2$: Abbe number of the second lens
$v_3$: Abbe number of the third lens.

5. The imaging lens according to any one of claims 1 to 4, wherein:

an image surface side face of the third lens has an aspherical shape in which the negative power is weakened towards the periphery.

6. The imaging lens according to any one of claims 1 to 4, wherein:

an image surface side face of the third lens has an aspherical shape which is convex towards the periphery.

* * * * *